United States Patent
Lee et al.

(10) Patent No.: US 10,287,944 B2
(45) Date of Patent: May 14, 2019

(54) EXHAUST PURIFICATION SYSTEM AND METHOD OF DESULFURIZING LEAN NOX TRAP OF EXHAUST PURIFICATION SYSTEM PROVIDED WITH LEAN NOX TRAP AND SELECTIVE CATALYTIC REDUCTION CATALYST

(71) Applicants: HYUNDAI MOTOR COMPANY, Seoul (KR); FEV GMBH, Aachen (DE)

(72) Inventors: Jin Ha Lee, Seoul (KR); Won Soon Park, Seongnam-si (KR); Jin Woo Park, Suwon-si (KR); Ki Hyung Joo, Yongin-si (KR); Sera Lim, Hwaseong-si (KR); Thomas Wittka, Kornelimünster (DE); Alexander Vovk, Aachen (DE); Joschka Schaub, Aachen (DE)

(73) Assignees: HYUNDAI MOTOR COMPANY, Seoul (KR); FEV GMBH, Aachen (DE)

( * ) Notice: Subject to any disclaimer, the term of this patent is extended or adjusted under 35 U.S.C. 154(b) by 519 days.

(21) Appl. No.: 14/955,858

(22) Filed: Dec. 1, 2015

(65) Prior Publication Data
US 2017/0058743 A1    Mar. 2, 2017

(30) Foreign Application Priority Data
Aug. 25, 2015  (KR) .................. 10-2015-0119557

(51) Int. Cl.
*F01N 3/20* (2006.01)
*B01D 53/94* (2006.01)
*B01J 20/30* (2006.01)

(52) U.S. Cl.
CPC ....... *F01N 3/2066* (2013.01); *B01D 53/9418* (2013.01); *B01D 53/9422* (2013.01);
(Continued)

(58) Field of Classification Search
CPC ............ B01D 53/9418; B01D 53/9422; F02D 41/028
See application file for complete search history.

(56) References Cited

U.S. PATENT DOCUMENTS 7,454,900 B2 * 11/2008 Hayashi ................ F01N 3/0842
60/274
2004/0123585 A1 * 7/2004 Yamaguchi ........ B01D 53/9431
60/274
(Continued)

FOREIGN PATENT DOCUMENTS

JP    2008-190461 A    8/2008
KR    10-2011-0062149 A    6/2011
KR    10-2015-0059535 A    6/2015

*Primary Examiner* — Patrick D Maines
(74) *Attorney, Agent, or Firm* — Morgan Lewis & Bockius LLP

(57) ABSTRACT

A method of desulfurizing a lean NOx trap (LNT) of an exhaust purification system provided with the LNT and a selective catalytic reduction (SCR) catalyst includes determining whether a desulfurization feasibility condition of the LNT is satisfied, determining whether a desulfurization demand condition of the LNT is satisfied, and performing desulfurization of the LNT if both of the desulfurization feasibility condition of the LNT and the desulfurization demand condition of the LNT are satisfied, wherein the desulfurization of the LNT is performed by repeating a desulfurization lean mode and a desulfurization rich mode according to whether a mode switching condition due to a desulfurization temperature is satisfied and whether a mode switching condition due to generation of H2S is satisfied.

18 Claims, 21 Drawing Sheets

(52) U.S. Cl.
CPC ...... *B01D 53/9495* (2013.01); *B01J 20/3085* (2013.01); *B01D 2257/304* (2013.01); *Y02A 50/2325* (2018.01)

(56) References Cited

U.S. PATENT DOCUMENTS

| | | | |
|---|---|---|---|
| 2005/0050884 A1* | 3/2005 | Nagaoka | F02D 41/028 60/295 |
| 2005/0160720 A1* | 7/2005 | Elwart | F01N 3/20 60/285 |
| 2005/0163690 A1* | 7/2005 | Elwart | B01D 53/96 423/230 |
| 2006/0191257 A1* | 8/2006 | Goralski, Jr. | F01N 3/0814 60/295 |
| 2007/0101701 A1* | 5/2007 | Acke | B01D 53/9431 60/286 |
| 2013/0291522 A1* | 11/2013 | Bisaiji | F01N 3/0885 60/286 |
| 2015/0167521 A1* | 6/2015 | Sakurai | F01N 3/2066 422/105 |

* cited by examiner

EXHAUST PURIFICATION SYSTEM AND METHOD OF DESULFURIZING LEAN NOX TRAP OF EXHAUST PURIFICATION SYSTEM PROVIDED WITH LEAN NOX TRAP AND SELECTIVE CATALYTIC REDUCTION CATALYST

CROSS-REFERENCE TO RELATED APPLICATION

This application claims the benefit of priority to Korean Patent Application No. 10-2015-0119557, filed with the Korean Intellectual Property Office on Aug. 25, 2015, the entire contents of which are incorporated herein by reference.

TECHNICAL FIELD

The present disclosure relates to a method of desulfurizing a lean NOx trap (LNT) of an exhaust purification system provided with the LNT and a selective catalytic reduction (SCR) catalyst, and an exhaust purification system. More particularly, the present disclosure relates to a method of desulfurizing a LNT of an exhaust purification system provided with the LNT and an SCR catalyst and an exhaust purification system that improves purification efficiency of NOx and fuel efficiency by precisely determining a timing at which desulfurization of the LNT is possible and a mode switching timing between a lean mode and a rich mode when desulfurization proceeds.

BACKGROUND

Generally, exhaust gas flowing out from an engine through an exhaust manifold is driven into a catalytic converter mounted at an exhaust pipe and is purified therein. After that, a noise of the exhaust gas is decreased while passing through a muffler and then the exhaust gas is emitted into the air through a tail pipe. The catalytic converter purifies pollutants contained in the exhaust gas. In addition, a particulate filter for trapping particulate matter (PM) contained in the exhaust gas is mounted in the exhaust pipe.

A denitrification catalyst (DeNOx catalyst) is one type of such a catalytic converter and purifies nitrogen oxide (NOx) contained in the exhaust gas. If reducing agents such as urea, ammonia, carbon monoxide, and hydrocarbons (HC) are supplied to the exhaust gas, the NOx contained in the exhaust gas is reduced in the DeNOx catalyst through oxidation-reduction reactions with the reducing agents.

Recently, a lean NOx trap (LNT) catalyst has been used, such as a DeNOx catalyst. The LNT catalyst adsorbs the NOx contained in the exhaust gas when an air/fuel ratio is lean, and releases the adsorbed NOx and reduces the released nitrogen oxide and the nitrogen oxide contained in the exhaust gas when the air/fuel ratio is rich (hereinafter, it will be called a 'regeneration of the LNT').

Since materials which adsorb the nitrogen oxide in the LNT, however, are base materials, sulfur oxide (material obtained by oxidizing sulfur contained in fuel or engine oil) as well as the nitrogen oxide contained in the exhaust gas is adsorbed. Sulfur poisoning in the LNT deteriorates a purification efficiency of the LNT. Therefore, desulfurization of the LNT may be necessary.

The above information disclosed in this Background section is only for enhancement of understanding of the background of the disclosure and therefore it may contain information that does not form the prior art that is already known in this country to a person of ordinary skill in the art.

SUMMARY OF THE DISCLOSURE

The present disclosure has been made in an effort to provide a method of desulfurizing a lean NOx trap (LNT) of an exhaust purification system provided with the LNT and a selective catalytic reduction (SCR) catalyst and the exhaust purification system having advantages of improving purification efficiency of NOx and fuel efficiency by precisely determining a desulfurization timing of the LNT.

Another embodiment of the present disclosure provides a method of desulfurizing an LNT and an exhaust purification system having further advantages of protecting the LNT and further improving fuel economy by determining a mode switching timing between a lean mode and a rich mode when desulfurization of the LNT proceeds.

A method of regenerating of a lean NOx trap (LNT) of an exhaust purification system provided with the LNT and a selective catalytic reduction (SCR) catalyst according to an exemplary embodiment of the present disclosure may include: determining whether a desulfurization feasibility condition of the LNT is satisfied; determining whether a desulfurization demand condition of the LNT is satisfied; and performing desulfurization of the LNT if both of the desulfurization feasibility condition of the LNT and the desulfurization demand condition of the LNT are satisfied, wherein the desulfurization of the LNT is performed by repeating a desulfurization lean mode and a desulfurization rich mode according to whether a mode switching condition due to a desulfurization temperature is satisfied and whether a mode switching condition due to generation of H2S is satisfied.

The mode switching condition due to the desulfurization temperature may be satisfied when a lean mode condition due to the desulfurization temperature or a rich mode condition due to the desulfurization temperature is satisfied based on a temperature state above target window, a temperature state below target window, whether a delay time condition is satisfied, an engine operation mode and sign of a temperature difference between the desulfurization lean mode and the desulfurization rich mode.

The temperature state above target window and the temperature state below target window may be determined based on a temperature controllable state, a temperature at a downstream of the LNT, an engine speed and an engine torque.

The delay time condition may be satisfied when (1) the engine operation mode is the desulfurization rich mode or the desulfurization lean mode, (2) the engine operation mode continues for a predetermined delay, and satisfaction of the conditions (1) and (2) continues for a delay time.

The delay time may be calculated based on an absolute value of the temperature difference between the desulfurization lean mode and the desulfurization rich mode and a mass flow of an exhaust gas.

The mode switching condition due to generation of H2S may be satisfied when a rich mode condition due to generation of H2S or a lean mode condition due to generation of H2S is satisfied.

The rich mode condition due to generation of H2S may be satisfied when a temperature uncontrollable state is output, the engine operation mode is the desulfurization lean mode, and a time for which the engine operation mode is the desulfurization lean mode is longer than or equal to a final target lean period.

The final target lean period may be calculated based on a base lean period according to an accumulated time for which the engine operation mode was the desulfurization rich mode in the past and a lean period correction factor according to the mass flow of the exhaust gas and a difference between a target temperature and an actual temperature.

The lean mode condition due to generation of H2S may be satisfied when the engine operation mode is the desulfurization rich mode, and a time for which the engine operation mode is the desulfurization rich mode is longer than or equal to a target maximum rich mode period or a lambda synchronization delay time has passed since a lambda sensor synchronization signal was input.

The target maximum rich mode period may be calculated based on a base rich period according to the temperature at the downstream of the LNT and a sulfur poisoning in the LNT, and a rich period correction factor according to an O2 adsorption in the LNT and an upstream lambda.

The lambda synchronization delay time may be calculated according to the upstream lambda.

The desulfurization feasibility condition of the LNT may be satisfied when an engine operation point condition, a temperature threshold condition for desulfurization, an engine operation mode condition, a vehicle speed condition and a soot load condition are satisfied and desulfurization break condition is not satisfied.

The desulfurization demand condition of the LNT may be satisfied if any one of a desulfurization beneficial condition, a DPF regeneration completion condition and a sulfur load condition is satisfied.

The desulfurization beneficial condition may be satisfied if a ratio of a current sulfur load to a maximum sulfur load is larger than or equal to a threshold sulfur load ratio, the average temperature of the LNT is higher than or equal to a minimum average temperature of the LNT for desulfurization, and a current vehicle speed is between a maximum desulfurization vehicle speed and a minimum desulfurization vehicle speed.

The threshold sulfur load ratio may be calculated according to a desulfurization beneficial factor, wherein the desulfurization beneficial factor is calculated based on a desulfurization condition state, the vehicle travel distance and an engine operation duration.

The minimum average temperature of the LNT for desulfurization may be calculated according to the ratio of the current sulfur load to the maximum sulfur load.

The maximum sulfur load may be calculated by multiplying a maximum sulfur load per volume according to the aging factor of the LNT to a volume of the LNT.

The DPF regeneration completion condition may be satisfied if the engine operation mode is a DPF regeneration mode, the soot load condition is satisfied, and the ratio of the current sulfur load to the maximum sulfur load is larger than or equal to a minimum sulfur load ratio.

The desulfurization demand condition of the LNT is not satisfied if a desulfurization reset condition is satisfied, wherein the desulfurization reset condition is satisfied if the desulfurization break condition is satisfied, a sulfur load in the LNT is smaller than or equal to a desulfurization reset sulfur load, or a duration for which the engine operation mode is the desulfurization rich mode is longer than or equal to a desulfurization rich demand duration.

An exhaust purification system according to another exemplary embodiment of the present disclosure may include: an engine including an injector for injecting fuel thereinto, generating power by burning mixture of air and the fuel, and exhausting the exhaust gas generated at combustion process to the exterior thereof through an exhaust pipe; a lean NOx trap (LNT) mounted on the exhaust pipe, and configured to adsorb nitrogen oxide (NOx) contained in the exhaust gas at a lean air/fuel ratio, to release the adsorbed nitrogen oxide at a rich air/fuel ratio, and to reduce the nitrogen oxide contained in the exhaust gas or the released nitrogen oxide using reductant including carbon or hydrogen contained in the exhaust gas; a dosing module mounted at the exhaust pipe downstream of the LNT and configured to directly inject reducing agent into the exhaust gas; a selective catalytic reduction (SCR) catalyst mounted at the exhaust pipe downstream of the dosing module and configured to reduce the NOx contained in the exhaust gas by using the reducing agent injected by the dosing module; and a controller configured to perform denitrification (DeNOx) by using the LNT and/or the SCR catalyst according to a driving condition of the engine, wherein the controller is configured to perform the method of desulfurization the LNT.

Since a desulfurization timing of the LNT is precisely determined, purification efficiency of the NOx may be improved according to a present embodiment.

Since unnecessary desulfurization of the LNT is prevented, fuel economy may be improved.

In addition, since a mode switching timing between a lean mode and a rich mode when desulfurization proceeds, thermal degradation of the LNT may be prevented and fuel economy may be improved.

DETAILED DESCRIPTION

Exemplary embodiments of the present disclosure will hereinafter be described in detail with reference to the accompanying drawings.

Figure 1:
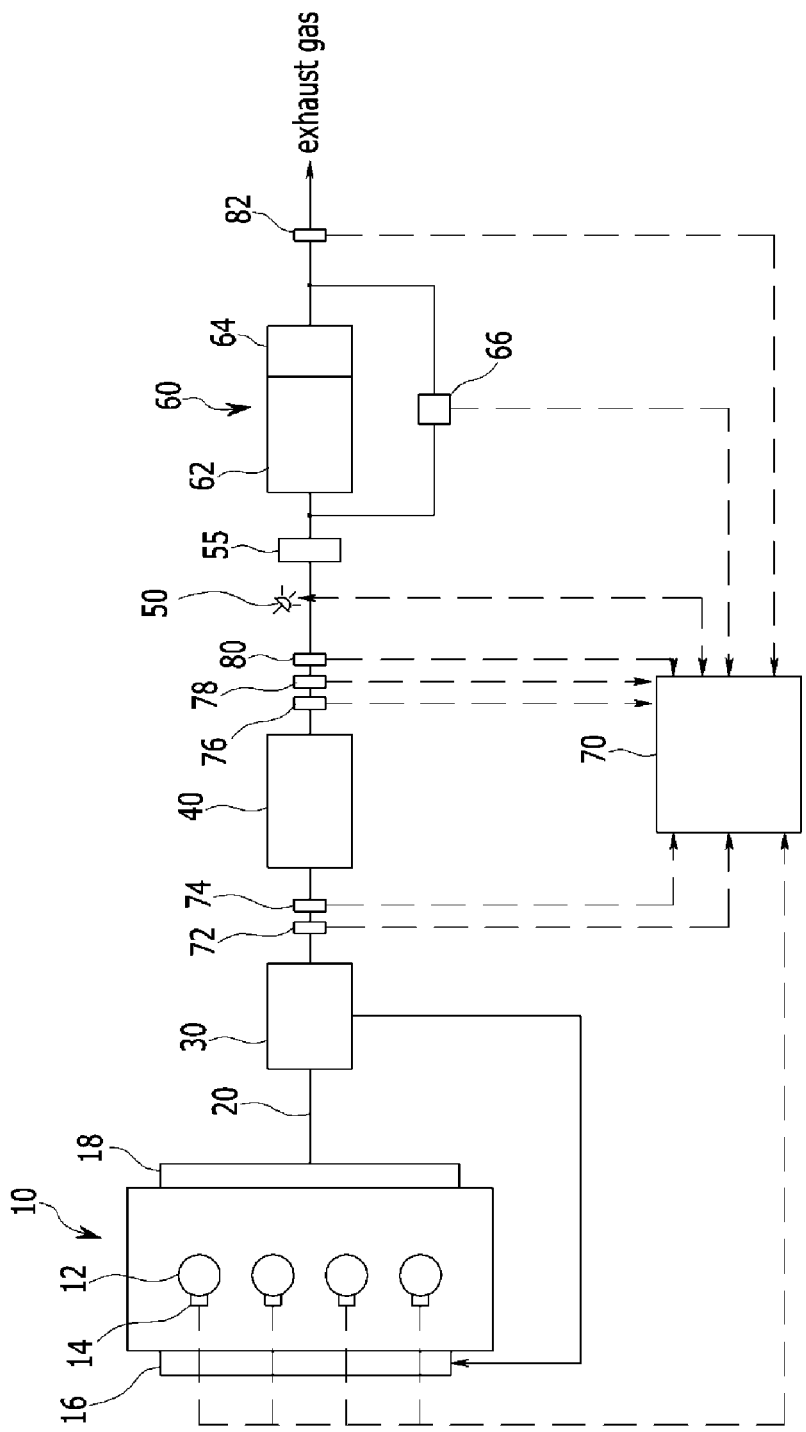
FIG. 1 is a schematic diagram of an exhaust purification system according to an exemplary embodiment of the present disclosure.

FIG. 1 is a schematic diagram of an exhaust purification system according to an exemplary embodiment of the present disclosure.

As shown in FIG. 1, an exhaust system for an internal combustion engine may include an engine 10, an exhaust pipe 20, an exhaust gas recirculation (EGR) apparatus 30, a lean NOx trap (LNT) 40, a dosing module 50, a particulate filter 60, and a controller 70. In addition, a turbocharger (not shown) may be mounted at the exhaust pipe 20. The turbocharger increases an intake air amount by using energy of an exhaust gas.

The engine 10 burns an air/fuel mixture in which fuel and air are mixed so as to convert chemical energy into mechanical energy. The engine 10 is connected to an intake manifold 16 so as to receive the air in a combustion chamber 12, and is connected to an exhaust manifold 18 such that the exhaust gas generated in combustion process is gathered in the exhaust manifold 18 and is exhausted to the exterior. An injector 14 is mounted in the combustion chamber 12 so as to inject the fuel into the combustion chamber 12.

A diesel engine is exemplified herein, but a lean-burn gasoline engine may be used. In a case that the gasoline engine is used, the air/fuel mixture flows into the combustion chamber 12 through the intake manifold 16, and a spark plug (not shown) is mounted at an upper portion of the combustion chamber 12. In addition, if a gasoline direct injection (GDI) engine is used, the injector 14 is mounted at the upper portion of the combustion chamber 12.

The exhaust pipe 20 is connected to the exhaust manifold 18 so as to exhaust the exhaust gas to the exterior of a vehicle. The LNT 40, the dosing module 50, and the particulate filter 60 are mounted on the exhaust pipe 20 so as to remove a hydrocarbon, carbon monoxide, particulate matter, and nitrogen oxide (NOx) contained in the exhaust gas.

The exhaust gas recirculation apparatus 30 is mounted on the exhaust pipe 20, and a portion of the exhaust gas exhausted from the engine 10 is supplied back to the engine 10 through the exhaust gas recirculation apparatus 30. In addition, the exhaust gas recirculation apparatus 30 is connected to the intake manifold 16 so as to control a combustion temperature by mixing a portion of the exhaust gas with the air. Such control of the combustion temperature is performed by controlling an amount of the exhaust gas supplied back to the intake manifold 16 by control of the controller 70. Therefore, a recirculation valve (not shown) controlled by the controller 70 may be mounted on a line connecting the exhaust gas recirculation apparatus 30 and the intake manifold 16.

A first oxygen sensor (or a first lambda sensor) 72 is mounted on the exhaust pipe 20 downstream of the exhaust gas recirculation apparatus 30. The first oxygen sensor 72 detects an oxygen amount in the exhaust gas passing through the exhaust gas recirculation apparatus 30 and transmits a signal corresponding thereto to the controller 70 so as to help lean/rich control of the exhaust gas performed by the controller 70. In this specification, the detected value by the first oxygen sensor 72 is called a lambda at an upstream of the LNT (upstream lambda).

In addition, a first temperature sensor 74 is mounted on the exhaust pipe 20 downstream of the exhaust gas recirculation apparatus 30 and detects a temperature of the exhaust gas passing through the exhaust gas recirculation apparatus 30.

The LNT 40 is mounted on the exhaust pipe 20 downstream of the exhaust gas recirculation apparatus 30. The LNT 40 adsorbs the nitrogen oxide (NOx) contained in the exhaust gas at a lean air/fuel ratio, and releases the adsorbed nitrogen oxide and reduces the nitrogen oxide contained in the exhaust gas or the released nitrogen oxide at a rich air/fuel ratio. In addition, the LNT 40 may oxidize carbon monoxide (CO) and a hydrocarbon (HC) contained in the exhaust gas.

Herein, the hydrocarbon represents all compounds consisting of carbon and hydrogen contained in the exhaust gas and the fuel.

A second oxygen sensor 76, a second temperature sensor 78, and a first NOx sensor 80 are mounted on the exhaust pipe 20 downstream of the LNT 40.

The second oxygen sensor (or a second lambda sensor) 76 detects an oxygen amount contained in exhaust gas flowing into the particulate filter 60 and transmits a signal corresponding thereto to the controller 70. The controller 70 may perform the lean/rich control of the exhaust gas based on the detected values by the first oxygen sensor 72 and the second oxygen sensor 76. In this specification, the detected value by the second oxygen sensor 62 is called a lambda at a downstream of the LNT (downstream lambda).

The second temperature sensor 78 detects a temperature of the exhaust gas flowing into the particulate filter 60 and transmits a signal corresponding thereto to the controller 70.

The first NOx sensor 80 detects a NOx concentration contained in the exhaust gas flowing into the particulate filter 60 and transmits a signal corresponding thereto to the controller 70. The NOx concentration detected by the first NOx sensor 80 may be used to determine an amount of a reducing agent injected by the dosing module 50.

The dosing module 50 is mounted on the exhaust pipe 20 upstream of the particulate filter 60 and injects the reducing agent into the exhaust gas by control of the controller 70. Typically, the dosing module 50 injects urea and the injected urea is hydrolyzed and converted into ammonia. However, the reducing agent is not limited to the ammonia.

A mixer 55 is mounted on the exhaust pipe 20 downstream of the dosing module 50 and mixes the reducing agent and the exhaust gas evenly.

The particulate filter 60 is mounted on the exhaust pipe downstream of the mixer 55, traps particulate matter contained in the exhaust gas, and reduces the nitrogen oxide contained in the exhaust gas using the reducing agent injected by the dosing module 50. For these purposes, the particulate filter 60 includes a selective catalytic reduction catalyst on a diesel particulate filter (SDPF) 62 and an additional selective catalytic reduction (SCR) catalyst 64, but is not limited thereto.

It is to be understood that an SCR catalyst in this specification and claims, unless otherwise described, includes the SCR catalyst itself or the SDPF.

The SDPF 62 is formed by coating the SCR on walls defining channels of the DPF. Generally, the DPF includes a plurality of inlet channels and outlet channels. Each of the inlet channels includes an end that is open and an other end that is blocked, and receives the exhaust gas from a front end of the DPF. In addition, each of the outlet channels includes an end that is blocked and an other end that is open, and discharges the exhaust gas from the DPF. The exhaust gas flowing into the DPF through the inlet channels enters the outlet channels through porous walls separating the inlet channels and the outlet channels. After that, the exhaust gas is discharged from the DPF through the outlet channels. When the exhaust gas passes through the porous walls, the particulate matter contained in the exhaust gas is trapped. In addition, the SCR catalyst coated on the SDPF 62 reduces the nitrogen oxide contained in the exhaust gas using the reducing agent injected by the dosing module 50.

The additional SCR catalyst 64 is mounted at the rear of the SDPF 62. The additional SCR catalyst 64 further reduces the nitrogen oxide if the SDPF 62 purifies the nitrogen oxide completely. The additional SCR catalyst 64 may be mounted physically apart from the SDPF 62.

Meanwhile, a pressure difference sensor 66 is mounted on the exhaust pipe 20. The pressure difference sensor 66 detects a pressure difference between a front end portion and a rear end portion of the particulate filter 60, and transmits a signal corresponding thereto to the controller 70. The controller 70 may control the particulate filter 60 to be regenerated if the pressure difference detected by the pressure difference sensor 66 is greater than a predetermined pressure. In this case, the injector 14 post-injects the fuel so as to burn the particulate matter trapped in the particulate filter 60.

In addition, a second NOx sensor 82 is mounted on the exhaust pipe 20 downstream of the particulate filter 60. The second NOx sensor 82 detects a concentration of the nitrogen oxide contained in the exhaust gas exhausted from the particulate filter 60, and transmits a signal corresponding thereto to the controller 70. The controller 70 can check, based on the detected value by the second NOx sensor 82, whether the nitrogen oxide contained in the exhaust gas is normally removed in the particulate filter 60. That is, the second NOx sensor 82 may be used to evaluate performance of the particulate filter 60.

The controller 70 determines a driving condition of the engine based on the signals transmitted from each sensor, and performs the leans/rich control and controls the amount of the reducing agent injected by the dosing module 50 based on the driving condition of the engine. For example, the controller 70 may release the NOx from the LNT 40 by controlling the air/fuel ratio to be rich and may reduce the released NOx by using a reductant contained in the exhaust gas (in this specification, it will be called the 'regeneration of the LNT'). In addition, the controller 70 may remove the NOx at the SDPF 60 by injecting a reducing agent. The lean/rich control may be performed by controlling a fuel amount injected by the injector 14. In addition, the controller 70 prevents degradation of the LNT 40 and generation of hydrogen sulfide (H2S) by mode-changing between a lean mode and a rich mode when desulfurization of the LNT 40 proceeds.

The controller 70 is provided with a plurality of maps, characteristics of the LNT, and correction coefficients, and may determine a desulfurization start timing and a desulfurization end timing of the LNT and a switching timing to the rich mode and a switching timing to the lean mode. The plurality of maps, characteristics of the LNT, and correction coefficients may be set through a number of experiments, or other existing data.

In addition, the controller 70 controls regeneration of the particulate filter 60.

For these purposes, the controller 70 can be realized by one or more processors activated by a predetermined program, and the predetermined program can be programmed to perform each step of a method of desulfurizing the LNT according to an exemplary embodiment of the present disclosure.

Figure 2:
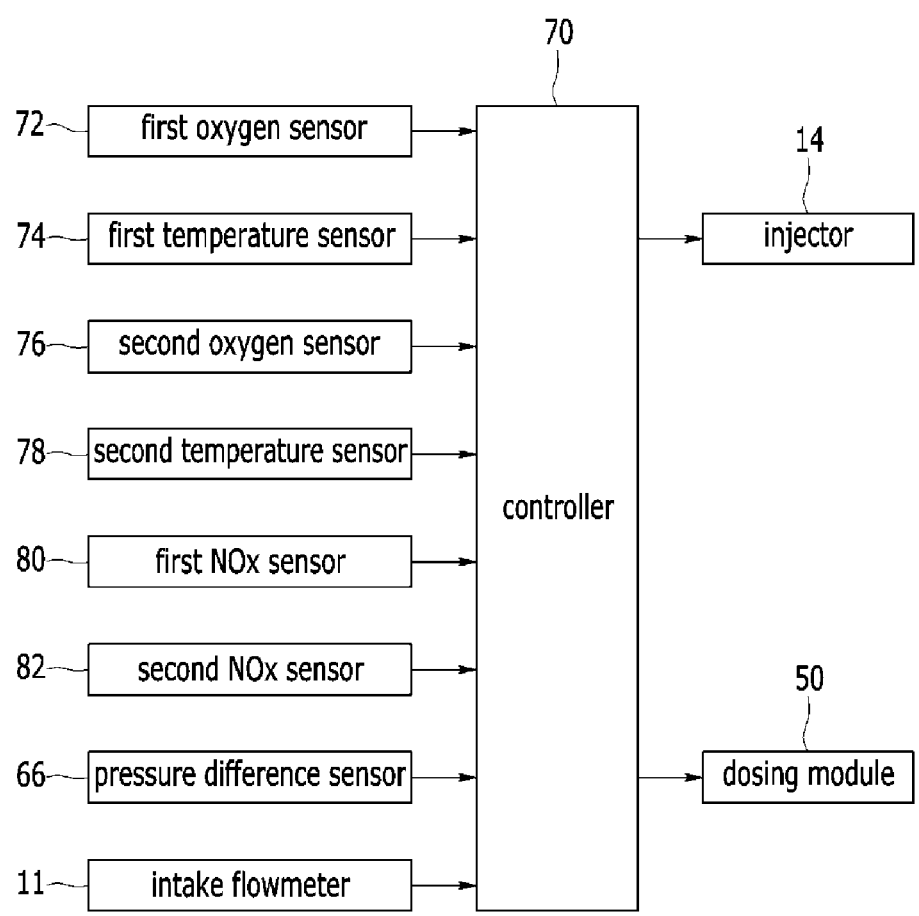
FIG. 2 is a block diagram illustrating a relationship of an input and output of a controller used in a method of desulfurizing an LNT in an exhaust purification system according to an exemplary embodiment of the present disclosure.

FIG. 2 is a block diagram illustrating a relationship of an input and output of a controller used in a method of desulfurizing an LNT in an exhaust purification system according to an exemplary embodiment of the present disclosure.

As shown in FIG. 2, the first oxygen sensor 72, the first temperature sensor 74, the second oxygen sensor 76, the second temperature sensor 78, the first NOx sensor 80, the second NOx sensor 82, the pressure difference sensor 66 and an intake flowmeter 11 may be electrically connected to the controller 70, and may transmit the detected values to the controller 70.

The first oxygen sensor 72 detects the oxygen amount in the exhaust gas passing through the exhaust gas recirculation apparatus 30 and transmits the signal corresponding thereto to the controller 70. The controller 70 may perform the lean/rich control of the exhaust gas based on the oxygen amount in the exhaust gas detected by the first oxygen sensor 72. The detected value by the first oxygen sensor 72 may be represented as the upstream lambda. The lambda means a ratio of actual air/fuel ratio to stoichiometric air/fuel ratio. If the lambda is greater than 1, the air/fuel ratio is lean. On the contrary, the air/fuel ratio is rich if the lambda is smaller than 1.

The first temperature sensor 74 detects a temperature of the exhaust gas passing through the exhaust gas recirculation apparatus 30 and transmits a signal corresponding thereto to the controller 70.

The second oxygen sensor 76 detects an oxygen amount in the exhaust gas flowing into the particulate filter 60 and transmits a signal corresponding thereto to the controller 70. The detected value by the second oxygen sensor 76 may be represented as the downstream lambda.

The second temperature sensor 78 detects a temperature of the exhaust gas flowing into the particulate filter 60 and transmits a signal corresponding thereto to the controller 70.

The first NOx sensor 80 detects a NOx concentration contained in the exhaust gas flowing into the particulate filter 60 and transmits a signal corresponding thereto to the controller 70.

The second NOx sensor 82 detects a NOx concentration contained in the exhaust gas exhausted from the particulate filter 60 and transmits a signal corresponding thereto to the controller 70.

The pressure difference sensor 66 detects a pressure difference between a front end portion and a rear end portion of the particulate filter 60 and transmits a signal corresponding thereto to the controller 70.

The intake flowmeter 11 detects an intake air flow supplied to an intake system of the engine 10 and transmits a signal corresponding thereto to the controller 70.

The controller 70 determines a driving condition of the engine, fuel injection amount, fuel injection timing, fuel injection pattern, injection amount of the reducing agent, regeneration timing of the particulate filter 60, and desulfurization/regeneration timing of the LNT 40 based on the transmitted value, and outputs a signal for controlling the injector 14 and the dosing module 50 to the injector 14 and the dosing module 50. In addition, the controller 70 may determine the desulfurization start timing and the desulfurization end timing of the LNT 40 and a mode changing timing between the rich mode and the lean mode.

Meanwhile, a plurality of sensors other than the sensors illustrated in FIG. 2 may be mounted in the exhaust purification device according to the exemplary embodiment of the present disclosure. For better comprehension and ease of description, however, description of the plurality of sensors will be omitted.

Hereinafter, referring to FIG. 3 to FIG. 21, a method of desulfurizing the LNT according to an exemplary embodiment of the present disclosure will be described in detail.

FIG. 3 to FIG. 21 are flowcharts of a method of desulfurizing the LNT according to an exemplary embodiment of the present disclosure.

Figure 3:
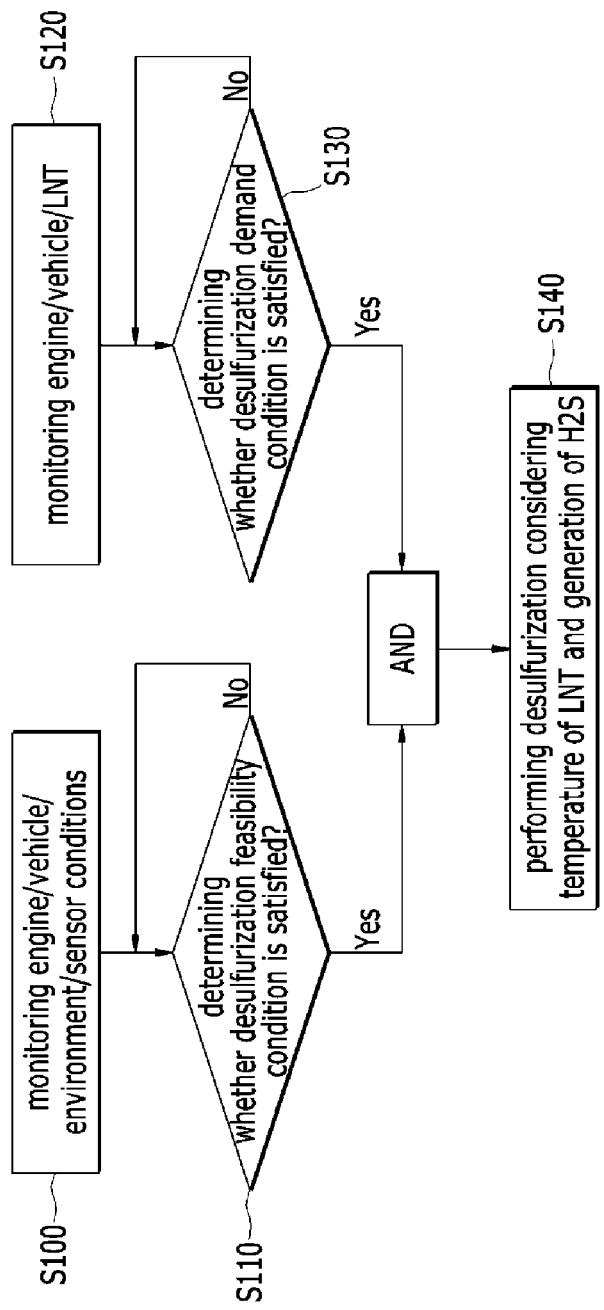
FIG. 3 is a flowchart of a method of desulfurizing an LNT according to an exemplary embodiment of the present disclosure.

As shown in FIG. 3, the controller 70 and various sensors monitor engine/vehicle/environment/sensor conditions at step S100, and the controller 70 determines whether the engine/vehicle/environment/sensor conditions satisfy a desulfurization feasibility condition of the LNT at step S110 in the method of desulfurizing the LNT according to the exemplary embodiment of the present disclosure. In addition, the controller 70 and various sensors monitor an engine/vehicle/LNT at step S120, and the controller 70 determines whether states of the engine/vehicle/LNT satisfy a desulfurization demand condition of the LNT at step S130. After that, the controller 70 performs desulfurization of the LNT 40 considering a temperature of the LNT 40 and generation of the H2S at step S140 if both of the desulfurization feasibility condition of the LNT and the desulfurization demand condition of the LNT are satisfied. If neither of the desulfurization feasibility condition of the LNT and the desulfurization demand condition of the LNT is satisfied, the controller 70 does not perform the desulfurization of the LNT 40 and continuously checks whether each condition is satisfied.

Figure 4:
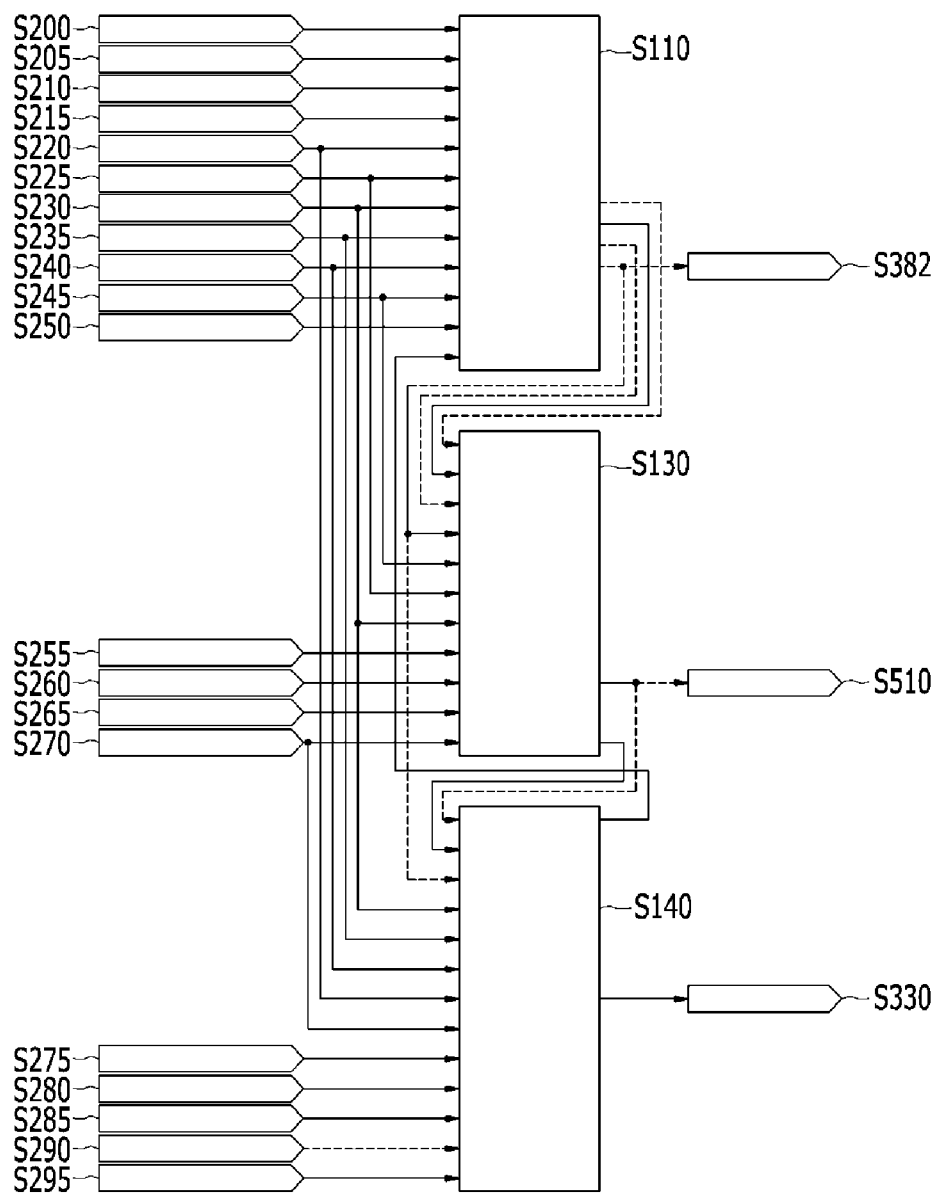
FIG. 4 illustrates a flowchart in FIG. 3 in further detail.

Referring to FIG. 4, the method of desulfurizing the LNT according to the exemplary embodiment of the present disclosure will be described in further detail.

As shown in FIG. 4, the method of desulfurizing the LNT begins with detecting or calculating various data. That is, the controller 70 detects a current drive state at step S200, detects an upstream turbo temperature state at step S205, detects a general NOx release condition state at step S210, detects a gear stage state at step S215, detects or calculates a temperature of the exhaust gas at the downstream of the LNT 40 (hereinafter, it will be called 'temperature at downstream of the LNT') at step S220, and detects or calculates a vehicle speed at step S225. Herein, the current drive state represents whether the engine can be currently operated at a normal mode, an LNT regeneration mode, an LNT desulfurization mode, an SDPF regeneration mode, or an SDPF desulfurization mode. That is, if the engine can be currently operated at the normal mode, the current drive state which is a result of comparison of a current engine operation with the normal mode may be "True" or "1," and the current drive state which is a result of comparison of the current engine operation with the LNT regeneration mode may be "False" or "0".

In addition, the upstream turbo temperature state represents whether a temperature at an upstream of the turbocharger is within a predetermined range.

If the temperature at the upstream of the turbocharger is within the predetermined range, the upstream turbo temperature state may be "True" or "1". On the contrary, if the temperature at the upstream of the turbo charger is not within the predetermined range, the upstream turbo temperature state may be "False" or "0".

The general NOx release condition state represents whether the current states of the engine/environment/LNT satisfy a general condition at which the NOx can be released, and includes states of the first and second NOx sensors 80 and 82, a coolant temperature state, a battery voltage state, a fuel temperature state, and so on. Herein, a state of a sensor indicates the sensor is activated. If the sensor is activated, the state of the sensor may be a value of "True" or "1". However, if the sensor is not activated, the state of the sensor may be a value of "False" or "0". In addition, each of the coolant temperature state, the battery voltage state, and the fuel temperature state may be a value of "True" or "1" if each of a coolant temperature, a battery voltage, and a fuel temperature is within a predetermined range. However, each of the coolant temperature state, the battery voltage state, and the fuel temperature state may be a value of "False" or "0" if each of the coolant temperature, the battery voltage, and the fuel temperature is not within a predetermined range. If all the states included in the general NOx release condition state are values of "True" or "1", the general NOx release condition state is a value of "True" or "1".

The gear stage state represents whether the gear stage is within a predetermined gear stage range, the temperature at the downstream of the LNT 40 may be detected by the first and second temperature sensors 74 and 78 or may be calculated according to a driving condition of the engine by the controller 70, and the vehicle speed may be detected by a speed sensor mounted at a wheel or a transmission of the vehicle.

It is to be understood that detecting data by the controller 70 includes detecting data by a sensor electrically connected to the controller 70.

In addition, the controller 70 detects an engine operation mode at step S230, detects or calculates an engine speed at step S235, detects or calculates an engine torque at step S240, calculates an average temperature of the LNT 40 at step S245, and calculates a soot load in the SDPF 60 (soot mass loaded in the SDPF 60) at step S250.

Herein, the engine operation mode includes a normal mode, an LNT regeneration mode, an LNT desulfurization mode, an SDPF regeneration mode, and so on. The normal mode is a mode that is not the LNT regeneration mode, the LNT desulfurization mode, or the SDPF regeneration mode.

In addition, the engine speed may be detected by a speed sensor mounted on an output shaft of the engine 10, the engine torque may be calculated according to the driving condition of the engine, the average temperature of the LNT 40 may be calculated based on the temperature of the exhaust gas at the upstream of the LNT 40 and the temperature at the downstream of the LNT by the controller 70, and the soot load in the SDPF 60 may be calculated by the controller 70 based on the pressure difference detected by the pressure difference sensor 66.

The controller 70 detects an engine operation duration at step S255, calculates an aging factor of the LNT 40 at step S260, calculates a vehicle travel distance at step S265, and calculates a sulfur load in the LNT 40 (sulfur mass loaded in the LNT 40) at step S270.

Herein, the engine operation duration means a duration for which the engine 10 is operated without stopping after being started, the aging factor of the LNT 40 may be calculated according to a use period of the LNT 40, the vehicle travel distance means a distance that the vehicle travels under a predetermined condition, and the sulfur load in the LNT 40 is calculated by the controller 70 based on the fuel injection amount, the vehicle travel distance after previous desulfurization, and so on.

The controller 70 calculates a mass flow of the exhaust gas at step S275, calculates an O2 adsorption in the LNT 40 (O2 mass adsorbed in the LNT 40) at step S280, detects or calculates the upstream lambda at step S285, detects whether lambda sensor synchronization occurs at step S290, and calculates a target temperature of the exhaust gas passing through the LNT 40 at a desulfurization lean mode at step S295.

Herein, the mass flow of the exhaust gas passing through the LNT 40 may be calculated from the intake air flow detected by the intake flowmeter 11 and an exhaust gas recirculation (EGR) amount or may be detected by an additional sensor, and the O2 adsorption in the LNT 40 may be calculated based on the temperature of the LNT 40, operating history of the engine after previous regeneration of the LNT 40, the aging factor of the LNT 40, and so on. The upstream lambda may be detected by the first oxygen sensor 72 or may be calculated by the controller 70 based on the driving condition of the engine, the state of the LNT 40, and so on. Whether the lambda sensor synchronization occurs represents whether a difference between the lambdas detected by the first and second oxygen sensors 72 and 76 is lower than or equal to a predetermined value. The target temperature of the exhaust gas passing through the LNT 40 at the desulfurization lean mode may be set by a designer based on types and dimensions of the engine 10 and the LNT 40. Herein, a mass flow means a mass per unit time. The mass is calculated by integrating the mass flow over a time.

If various data is detected or calculated, the controller 70 determines at the step S110 whether the desulfurization feasibility condition of the LNT is satisfied based on the current drive state, the upstream turbo temperature state, the general NOx release condition state, the gear stage state, the temperature at the downstream of the LNT, the vehicle speed, the engine operation mode, the engine speed, the engine torque, the average temperature of the LNT 40, the soot load in the SDPF 60, and a desulfurization lean mode period (which will be described later).

In addition, the controller 70 determines at the step S130 whether the desulfurization demand condition of the LNT based on the desulfurization feasibility condition, the vehicle speed, the engine operation duration, a desulfurization condition state (which will be described later), the average temperature of the LNT 40, the vehicle travel distance, the sulfur load in the LNT 40, the aging factor of the LNT 40, a soot load condition (it will be described later), the engine operation mode, and a desulfurization break condition (which will be described later).

After that, if both of the desulfurization feasibility condition of the LNT and the desulfurization demand condition of the LNT are satisfied, the controller 70 performs the desulfurization of the LNT 40 at the step S140 based on a, desulfurization demand condition state (which will be described later), the target temperature of the exhaust gas passing through the LNT 40 at the desulfurization lean mode, the engine speed, the engine torque, the mass flow of the exhaust gas, the engine operation mode, the temperature at the downstream of the LNT, the sulfur load in the LNT 40, the O2 adsorption in the LNT 40, the upstream lambda, whether the lambda sensor synchronization occurs, the desulfurization demand condition, and the soot load condition, and outputs progress of desulfurization at step S330.

Hereinafter, referring to FIG. 5, step S110 in FIG. 4 will be described in further detail.

Figure 5:
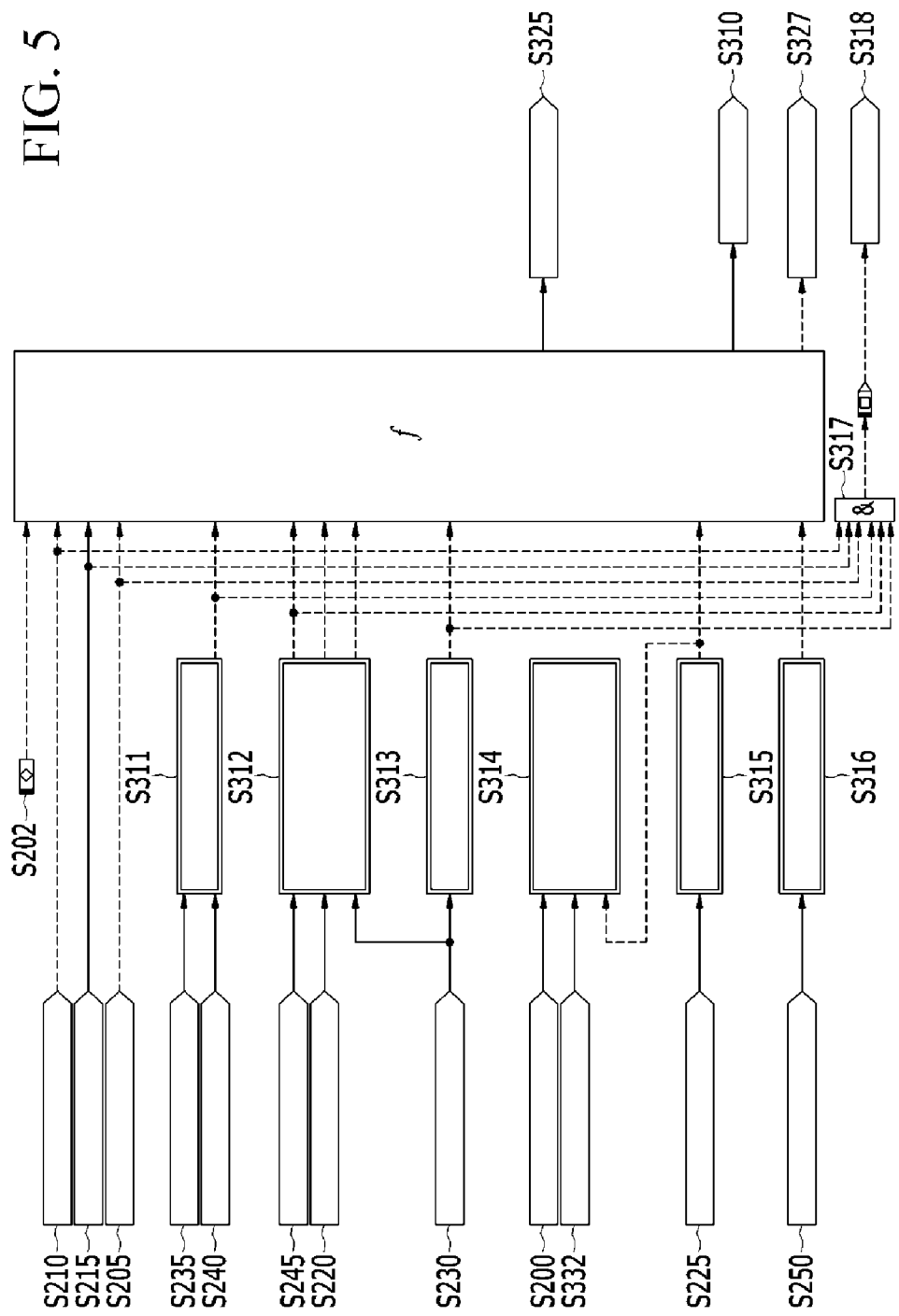
FIG. 5 illustrates step S110 in FIG. 4 in further detail.

Referring to FIG. 5, step S110 includes determining whether an engine operation point condition is satisfied at step S311, determining whether a temperature threshold condition for desulfurization is satisfied at step S312, determining whether an engine operation mode condition is satisfied at step S313, determining whether a desulfurization break condition is satisfied at step S314, determining whether a vehicle speed condition is satisfied at step S315, and determining whether a soot load condition is satisfied at step S316.

The controller 70 receives a signal of non-activation of manual desulfurization at step S202, receives the general NOx release condition state at step S210, receives the gear stage state at the step S215, and receives the upstream turbo temperature state at the step S205. In addition, the controller 70 determines whether the engine operation point condition is satisfied based on the engine speed and the engine torque at step S311 and stores a determination result. The controller 70 determines whether the temperature threshold condition is satisfied based on the average temperature of the LNT 40, the temperature at the downstream of the LNT and the engine operation mode at step S312 and stores a determination result. The controller 70 determines whether the engine operation mode condition is satisfied based on the engine operation mode at step S313 and stores a determination result. The controller 70 determines whether the desulfurization break condition is satisfied based on the current drive state, the desulfurization lean mode period and the vehicle speed condition at step S314 and stores a determination result. The controller determines whether the vehicle speed condition is satisfied based on the vehicle speed at step S315 and stores a determination result. The controller determines whether the soot load condition is satisfied based on the soot load in the SDPF 60 at step S316 and stores a determination result.

The controller 70 outputs a desulfurization feasibility condition signal at step S310 if the manual desulfurization is not activated, all of the general NOx release condition state, the gear stage state and the upstream turbo temperature state are "True" or "1", the engine operation point condition is satisfied, the temperature threshold condition for desulfurization is satisfied, the engine operation mode condition is satisfied, the desulfurization break condition is not satisfied, the vehicle speed condition is satisfied, and the soot load condition is satisfied. In this process, the controller 70 outputs a non-satisfaction signal of the desulfurization break condition at step S325 and outputs a satisfaction signal of the soot load condition at step S327. In addition, the controller 70 outputs the desulfurization condition state at step S318 if all of the general NOx release condition state, the gear stage state and the upstream turbo temperature state are "True" or "1", the engine operation point condition is satisfied, an LNT average temperature state at step S323 (which will be described later) is "True" or "1", and the engine operation mode condition is satisfied at step S317.

Hereinafter, referring to FIG. 6, step S311 in FIG. 5 will be described in further detail.

Figure 6:
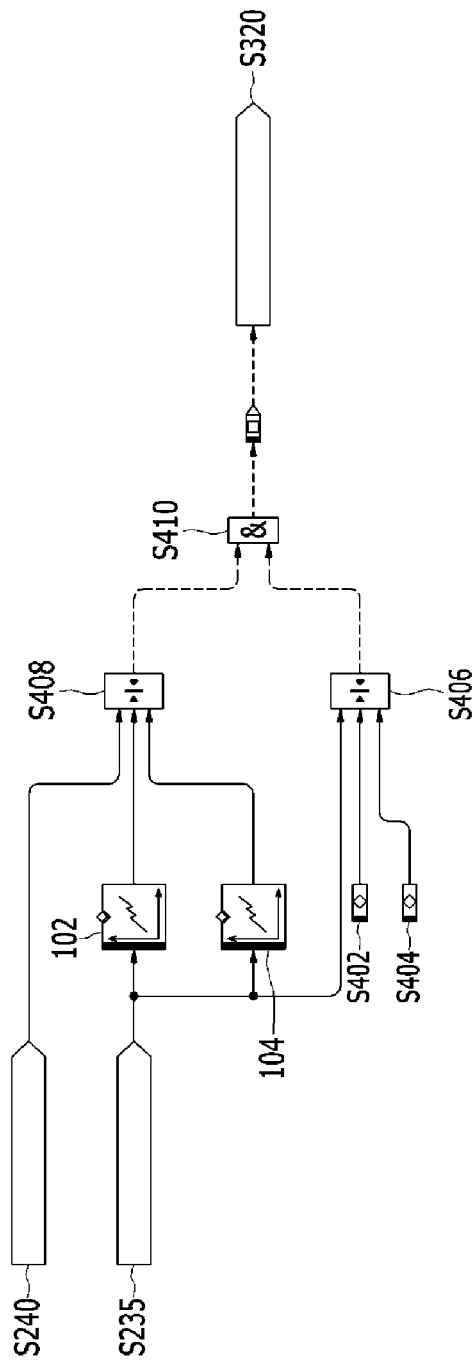
FIG. 6 illustrates step S311 in FIG. 5 in further detail.

As shown in FIG. 6, the controller 70 inputs the engine speed into a predetermined maps 102 and 104 so as to calculate a minimum engine torque and a maximum engine torque, and determines whether a current engine torque is within the minimum engine torque and the maximum engine torque at step S408. In addition, the controller 70 receives a minimum engine speed and a maximum engine speed at steps S402 and S404, and determines whether the engine speed is within the minimum engine speed and the maximum engine speed at step S406. If both of the step S408 condition and the step S406 condition are satisfied at step S410, the controller 70 outputs a satisfaction signal of the engine operation point condition at step S320.

Hereinafter, referring to FIG. 7, step S312 in FIG. Swill be described in further detail.

Figure 7:
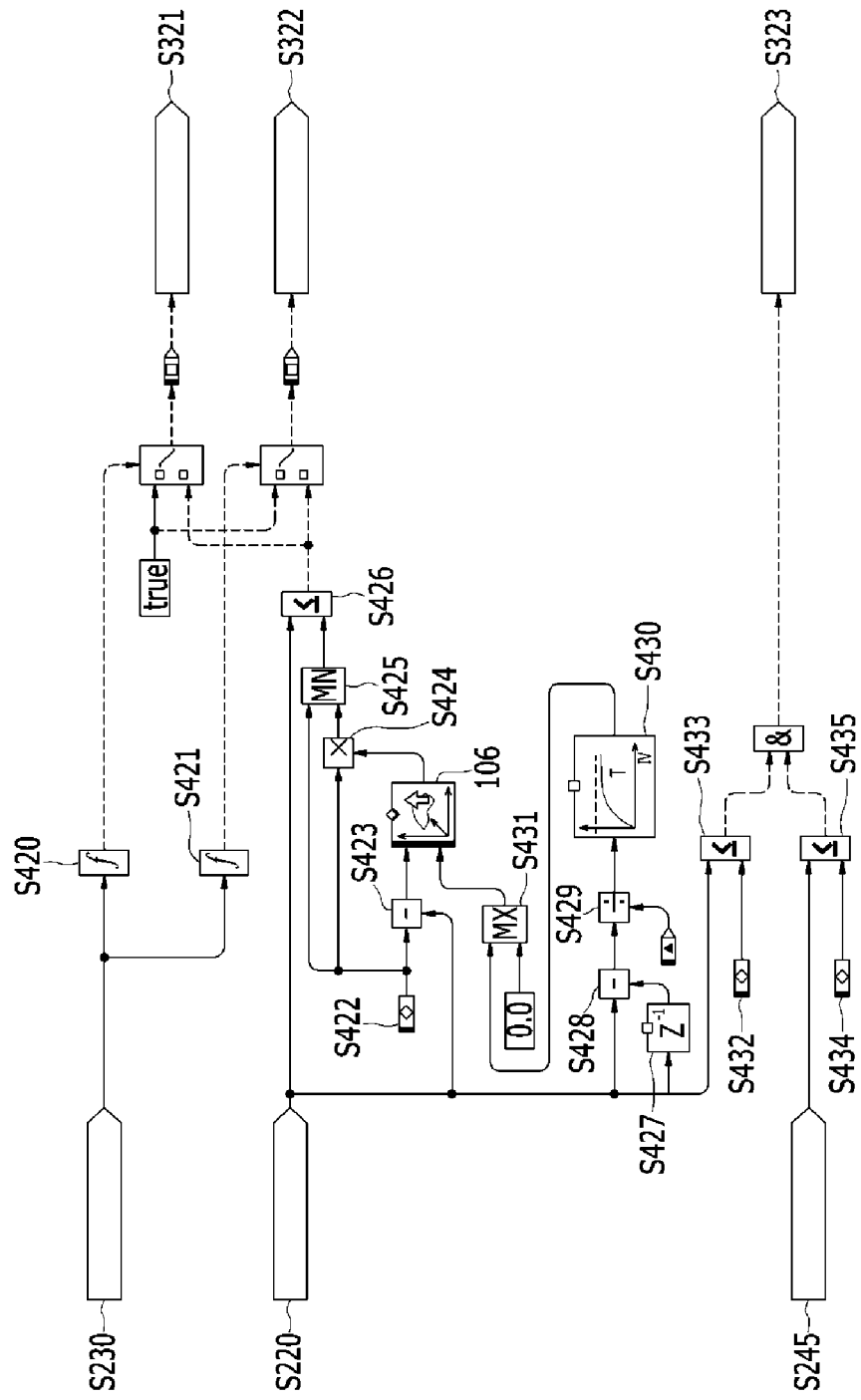
FIG. 7 illustrates step S312 in FIG. 5 in further detail.

As shown in FIG. 7, the controller 70 receives a minimum temperature at the downstream of the LNT 40 and a minimum average temperature of the LNT 40 at steps S432 and S434, determines whether the temperature at the downstream of the LNT is higher than or equal to the minimum temperature at the downstream of the LNT 40 at step S433, and determines whether the average temperature of the LNT 40 is higher than or equal to the minimum average temperature of the LNT 40 at step S435. If both of the step S433 condition and the step S435 condition are satisfied, the controller 70 outputs "True" or "1" as a minimum temperature state of the LNT 40 at step S323.

In addition, the controller 70 reads a previous temperature of the exhaust gas at the downstream of the LNT 40 at step S427, calculates a temperature difference at the downstream of the LNT 40 by subtracting the previous temperature of the exhaust gas at the downstream of the LNT 40 from a current temperature of the exhaust gas at the downstream of the LNT 40 at step S428, and calculates a temperature gradient at the downstream of the LNT 40 by dividing the temperature difference at the downstream of the LNT 40 by a predetermined time interval at step S429. After that, the controller 70 filters the temperature gradient at the downstream of the LNT 40 at step S430, selects a maximum value of the filtered temperature gradient at the downstream of the LNT 40 at step S431, and inputs the selected value into a predetermined map 106. Further, the controller 70 receives a predetermined maximum temperature of the LNT 40 at step S422, calculates a difference between the predetermined maximum temperature of the LNT 40 and the current temperature of the exhaust gas at the downstream of the LNT 40 at step S423, and inputs the difference into the predetermined map 106. That is, the controller 70 calculates a factor by inputting the selected value and the difference into the predetermined map 106, and calculates an adjusted maximum temperature of the LNT 40 by multiplying the factor and the predetermined maximum temperature of the LNT 40 at step S424. After that, the controller 70 selects a minimum value of the adjusted maximum temperature of the LNT 40 and the predetermined maximum temperature of the LNT 40 at step S425, and determines whether the current temperature of the exhaust gas at the downstream of the LNT 40 is lower than or equal to the selected minimum value at step S426.

After that, the controller 70 determines whether the engine operation mode is the desulfurization lean mode at step S420. If the engine operation is the desulfurization lean mode, the controller 70 outputs the determination value at step S426 as a maximum lean temperature condition of the LNT at step S321. If the engine operation is not the desulfurization lean mode, the controller 70 outputs 'True' or '1' as the maximum lean temperature condition of the LNT at step S321. In addition, the controller 70 determines whether the engine operation mode is a desulfurization rich mode at step S421, outputs the determination value at step S426 as a maximum rich temperature condition of the LNT at step S322 if the engine operation mode is the desulfurization rich mode, and outputs 'True' or '1' as the maximum rich temperature condition of the LNT at step S322 if the engine operation mode is not the desulfurization rich mode.

Hereinafter, referring to FIG. 8, step S313 in FIG. 5 will be described in further detail.

Figure 8:
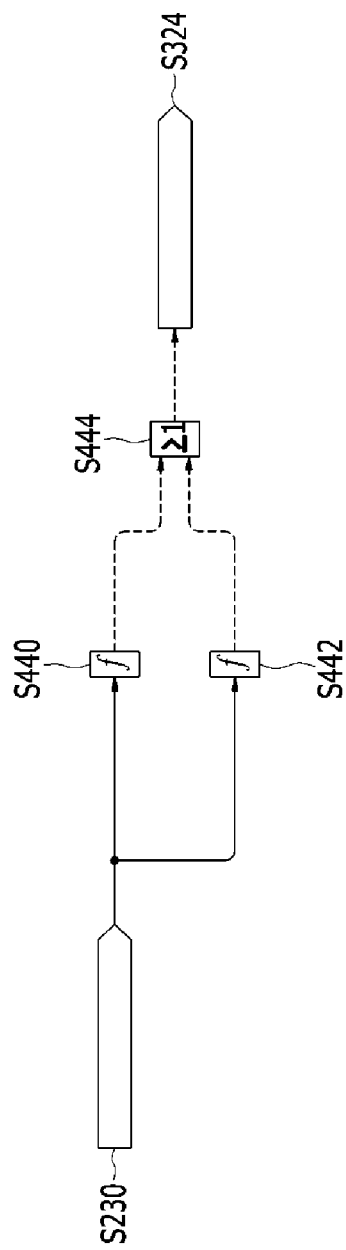
FIG. 8 illustrates step S313 in FIG. 5 in further detail.

As shown in FIG. 8, the controller 70 determines whether the engine operation mode is the normal mode at step S440, and determines whether the engine operation mode is the SDPF regeneration mode at step S442. If the engine operation mode is the normal mode or the SDPF regeneration mode at step S444, the controller 40 outputs a satisfaction signal of the engine operation point condition at step S324.

Hereinafter, referring to FIG. 9, step S314 in FIG. 5 will be described in further detail.

Figure 9:
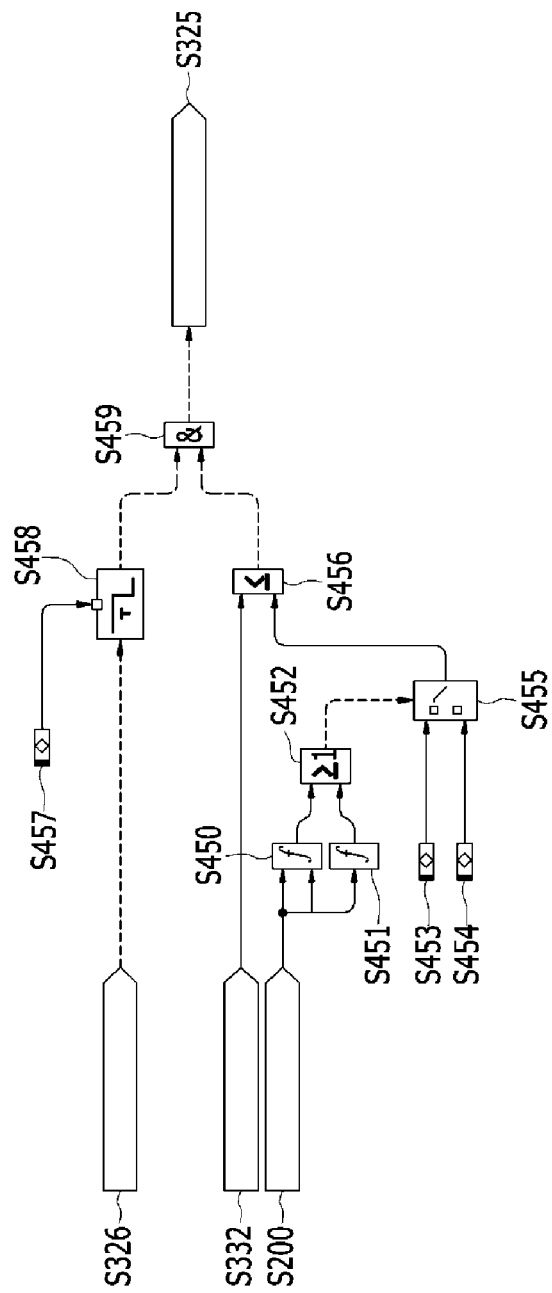
FIG. 9 illustrates step S314 in FIG. 5 in further detail.

As shown in FIG. 9, the controller 70 receives a predetermined allowance period at step S457, and determines whether 'False' or '0' is output as the vehicle speed condition for the predetermined allowance period at step S458. In addition, the controller 70 receives a minimum lean temperature period and a minimum heating period at steps S453 and S454, determines whether the engine operation mode is the normal mode at step S450, and determines whether the engine operation mode is the SDPF regeneration mode at step S451. If the engine operation mode is the normal mode or the SDPF regeneration mode at step S452, the controller 40 selects the minimum heating period at step S455. If the engine operation mode is not the normal mode and the SDPF regeneration mode at step S452, the controller 40 selects the minimum lean temperature period at step S455. After that, the controller 70 determines at step S456 whether a desulfurization lean mode period (a time for which the engine operation mode is the desulfurization lean mode) is shorter than or equal to the period selected at step S455.

In addition, if it is determined at step S458 that 'True' or '1' is output as the vehicle speed condition for the predetermined allowance period and it is determined at step S456 that the desulfurization lean mode period is shorter than or equal to the period selected at step S455, the controller 70 outputs the non-satisfaction signal of the desulfurization break condition at step S325.

Hereinafter, referring to FIG. 10, step S315 in FIG. 5 will be described in further detail.

Figure 10:
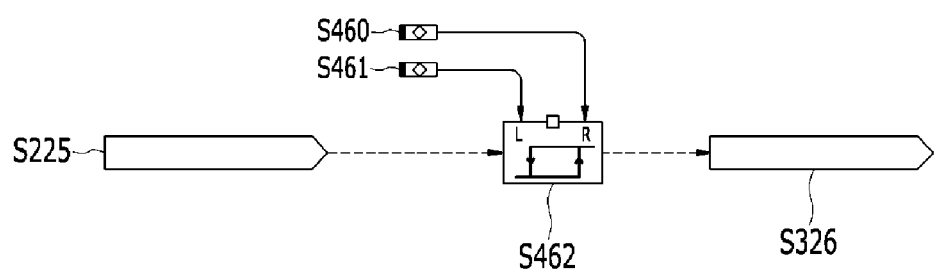
FIG. 10 illustrates step S315 in FIG. 5 in further detail.

As shown in FIG. 10, the controller 70 receives a maximum vehicle speed and a minimum vehicle speed at steps S460 and S461. After that, the controller 70 determines whether the current vehicle speed is within the maximum vehicle speed and the minimum vehicle speed at step S462, and outputs a satisfaction signal of the vehicle speed condition if the current vehicle speed is within the maximum vehicle speed and the minimum vehicle speed at step S326.

Hereinafter, referring to FIG. 11, step S316 in FIG. 5 will be described in further detail.

Figure 11:
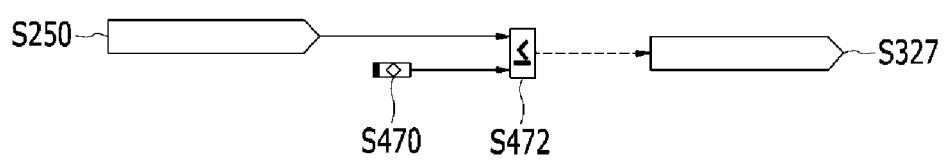
FIG. 11 illustrates step S316 in FIG. 5 in further detail.

As shown in FIG. 11, the controller 70 receives a threshold soot load at step S470, and determines whether the soot load in the SDPF 60 is lower than or equal to the threshold soot load at step S472. If the soot load is lower than or equal to the threshold soot load at step S472, the controller 70 outputs the satisfaction signal of the soot load condition at step S327.

Hereinafter, referring to FIG. 12, step S130 in FIG. 4 will be described in further detail.

Figure 12:
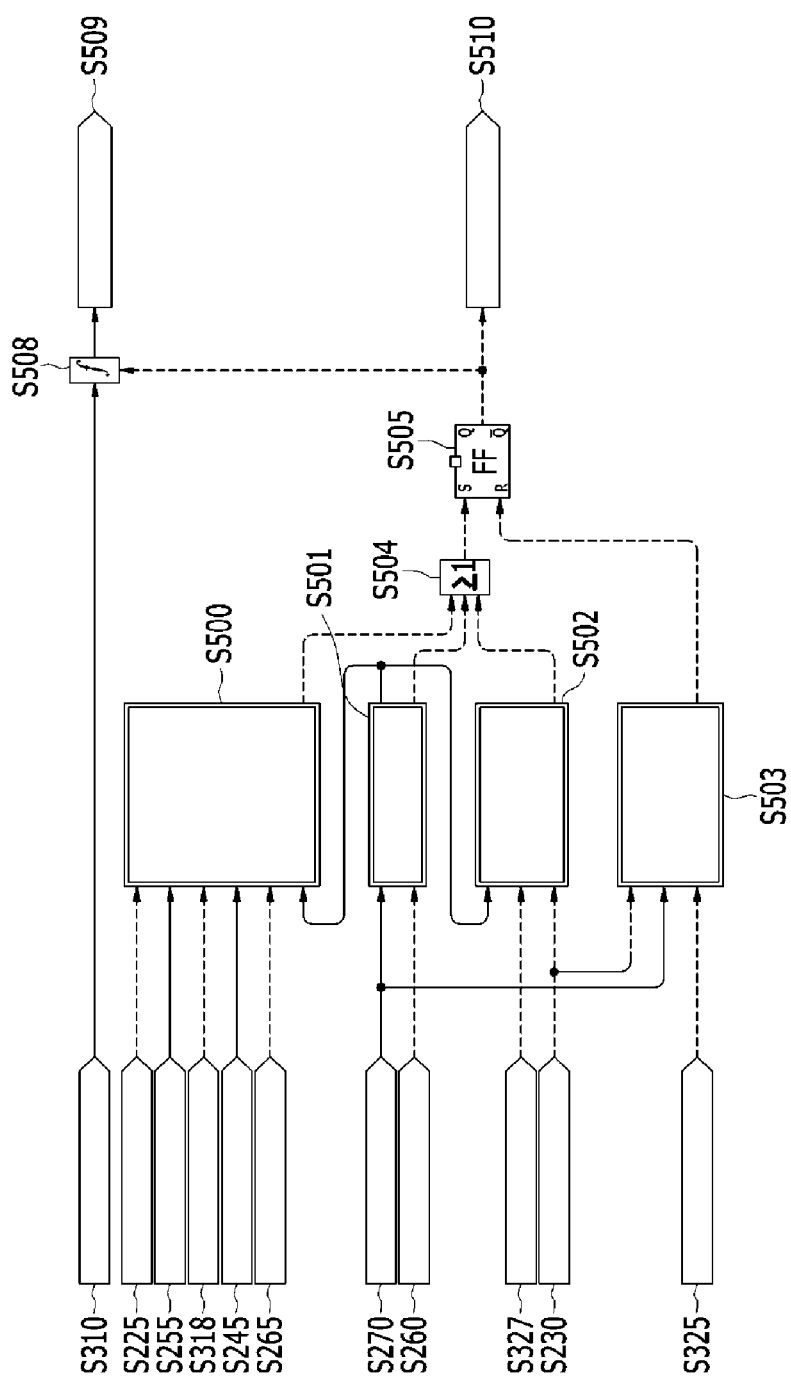
FIG. 12 illustrates step S130 in FIG. 4 in further detail.

Referring to FIG. 12, step S130 includes determining whether a desulfurization beneficial condition is satisfied at step S500, determining whether the sulfur load condition is satisfied at step S501, and determining whether an SDPF regeneration completion condition is satisfied at step S502. In addition, step S310 further includes determining whether a desulfurization reset condition is satisfied at step S503.

The controller 70 receives the vehicle speed at step S225, receives the engine operation duration at step S255, receives the desulfurization condition state at step S318, receives the average temperature of the LNT 40 at step S245, receives the vehicle travel distance at step S265, and receives a ratio of the current sulfur load to a maximum sulfur load at step S553 (which will be described later). After that, the controller 70 determines whether the desulfurization beneficial condition is satisfied based on the vehicle speed, the engine operation duration, the desulfurization condition state, the average temperature of the LNT 40, the vehicle travel distance and the ratio of the current sulfur load to the maximum sulfur load at step S500. If the desulfurization beneficial condition is satisfied at step S500, the controller 70 outputs a satisfaction signal of the desulfurization beneficial condition at step S524.

In addition, the controller 70 receives the sulfur load in the LNT 40 at step S270 and receives the aging factor of the LNT 40 at step S260. After that, the controller 70 determines whether the sulfur load condition is satisfied based on the sulfur load in the LNT 40 and the aging factor of the LNT 40 at step S501, and outputs a satisfaction signal of the sulfur load condition at step S555 if the sulfur load condition is satisfied at step S501.

In addition, the controller 70 receives the ratio of the current sulfur load to the maximum sulfur load at step S553, receives the satisfaction signal of the soot load condition at step S327, and receives the engine operation mode at step S230. After that, the controller 70 determines whether the SDPF regeneration completion condition is satisfied based on the ratio of the current sulfur load to the maximum sulfur load, the satisfaction signal of the soot load condition and the engine operation mode at step S502. If the SDPF regeneration completion condition is satisfied at step S502, the controller 70 outputs a satisfaction signal of the SDPF regeneration completion condition at step S564.

In addition, the controller 70 receives the engine operation mode at step S230, receives the sulfur load in the LNT 40 at step S270, and receives the non-satisfaction signal of the desulfurization break condition at step S325. After that, the controller 70 determines whether the desulfurization reset condition is satisfied based on the engine operation mode, the sulfur load in the LNT 40 and the non-satisfaction signal of the desulfurization break condition at step S503, and outputs a satisfaction signal of the desulfurization reset condition if the desulfurization reset condition is satisfied at step S577.

The controller 70 determines whether at least one of the satisfaction signal of the desulfurization beneficial condition, the satisfaction signal of the SDPF regeneration completion condition, and the satisfaction signal of the sulfur load condition is satisfied at step S505, outputs a satisfaction signal of the desulfurization demand condition at step S510 if at least one of the satisfaction signal of the desulfurization beneficial condition, the satisfaction signal of the SDPF regeneration completion condition, and the satisfaction signal of the sulfur load condition is satisfied. In addition, the controller 70 determines whether the satisfaction signal of the desulfurization reset condition is satisfied at step S505, and does not output the satisfaction signal of the desulfurization demand condition if the satisfaction signal of the desulfurization reset condition is output.

In addition, the controller 70 determines whether the satisfaction signal of the desulfurization feasibility condition and the satisfaction signal of the desulfurization demand condition are input at step S508, and outputs the desulfurization condition state at step S509. That is, if the satisfaction signal of the desulfurization feasibility condition and the satisfaction signal of the desulfurization demand condition are input, the desulfurization condition state is 'True' or '1'. However, if any one of the satisfaction signal of the desulfurization feasibility condition and the satisfaction signal of the desulfurization demand condition is not input, the desulfurization condition state is 'False' or '0'.

Hereinafter, referring to FIG. 13, step S500 in FIG. 12 will be described in further detail.

Figure 13:
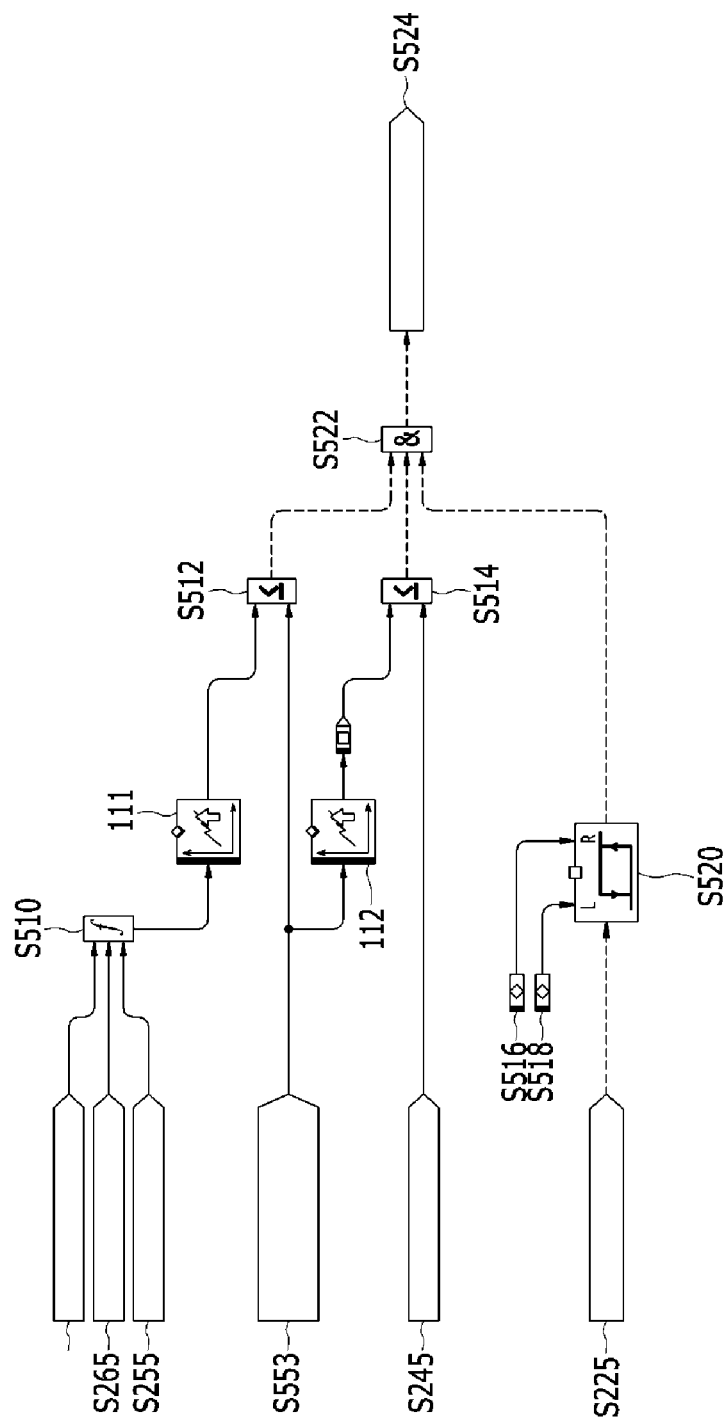
FIG. 13 illustrates step S500 in FIG. 12 in further detail.

As shown in FIG. 13, the controller 70 calculates a desulfurization beneficial factor based on the desulfurization condition state, the vehicle travel distance and the engine operation duration at step S510. For example, since the conditions are very good for desulfurization if the vehicle travels on a highway for a long time, the desulfurization beneficial factor is high. On the contrary, since it is hard to raise the temperature of the exhaust gas to a temperature necessary for desulfurization if the vehicle runs at a low speed or repeats stop and go travel on a city road or in a congested area, the desulfurization beneficial factor is low.

After that, the controller 70 input the desulfurization beneficial factor into a predetermined map 111 so as to calculate a threshold sulfur load ratio. At this time, if the desulfurization beneficial factor is high the threshold sulfur load ratio becomes low, and if the desulfurization beneficial factor is low the threshold sulfur load ratio becomes high. After that, the controller 70 determines whether the ratio of the current sulfur load to the maximum sulfur load is larger than or equal to the threshold sulfur load ratio at step S512.

The controller 70 inputs the ratio of the current sulfur load to the maximum sulfur load into a predetermined map 112 so as to calculate a minimum average temperature of the LNT for desulfurization, and determines whether the average temperature of the LNT 40 is higher than or equal to the minimum average temperature of the LNT for desulfurization at step S514.

In addition, the controller 70 receives a maximum desulfurization vehicle speed and a minimum desulfurization vehicle speed at steps S516 and S518, and determines whether the current vehicle speed is within the maximum desulfurization vehicle speed and the minimum desulfurization vehicle speed at step S520.

After that, the controller 70 determines whether the step S512 condition, the step S514 condition and the step S520 condition are satisfied at step S522, and outputs a satisfaction signal of the desulfurization beneficial condition if the step S512 condition, the step S514 condition and the step S520 condition are satisfied at step S524.

Hereinafter, referring to FIG. 14, step S501 in FIG. 12 will be described in further detail.

Figure 14:
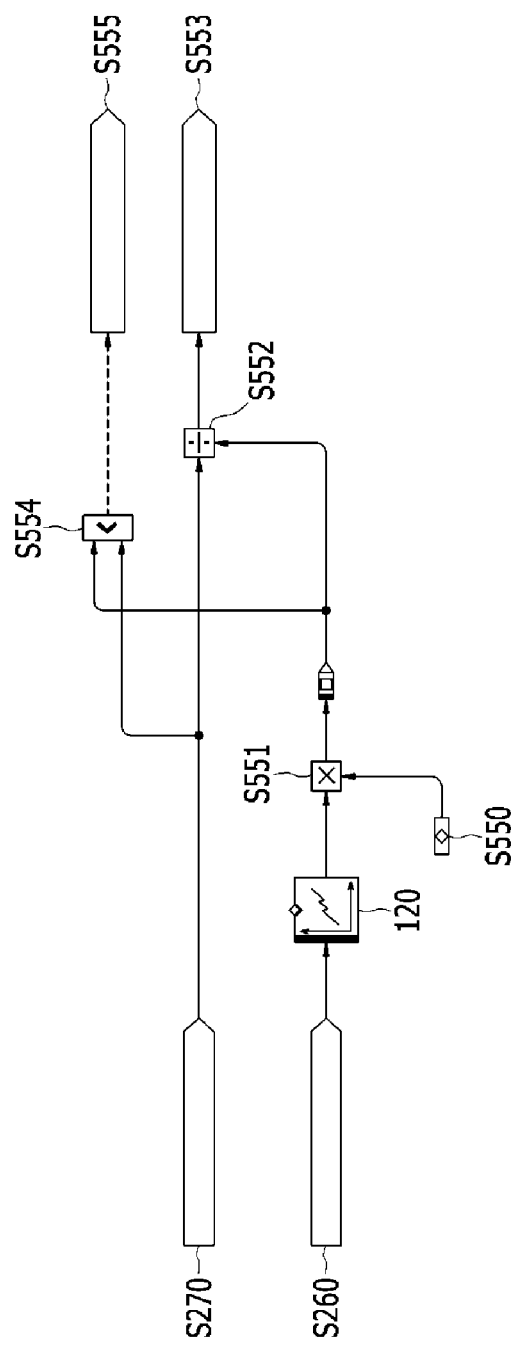
FIG. 14 illustrates step S501 in FIG. 12 in further detail.

As shown in FIG. 14, the controller 70 receives a volume of the LNT 40 at step S550, and calculates a maximum sulfur load per volume by inputting the aging factor of the LNT 40 into a predetermined map 120. After that, the controller 70 calculates a maximum sulfur load (maximum sulfur mass loaded in the LNT 40) by multiplying the maximum sulfur load per volume and the volume of the LNT 40 at step S551.

In addition, the controller 70 divides the sulfur load in the LNT 40 by the maximum sulfur load at step S552 and outputs the ratio of the current sulfur load to the maximum sulfur load at step S553. Further, the controller 70 determines whether the sulfur load in the LNT 40 is larger than the maximum sulfur load at step S554, and calculates a satisfaction signal of the sulfur load condition if the sulfur load in the LNT 40 is larger than the maximum sulfur load at step S555.

Hereinafter, referring to FIG. 15, step S502 in FIG. 12 will be described in further detail.

Figure 15:
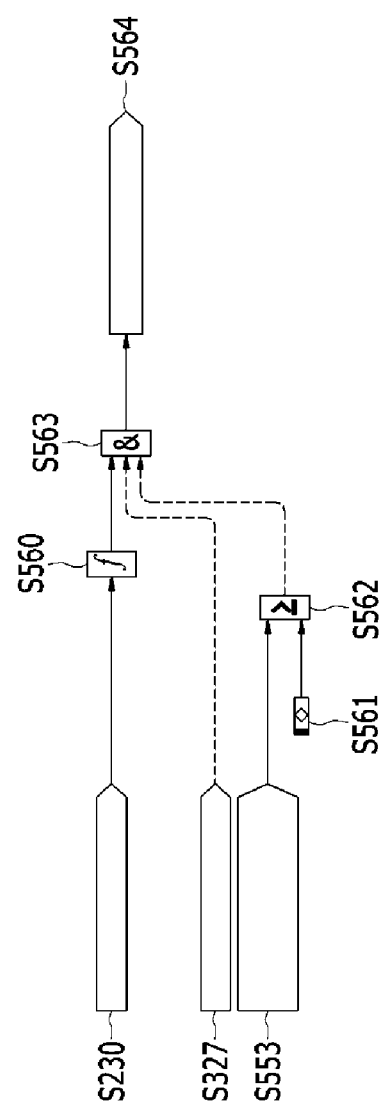
FIG. 15 illustrates step S502 in FIG. 12 in further detail.

As shown in FIG. 15, the controller 70 determines whether the engine operation mode is the SDPF regeneration mode at step S560. In addition, the controller 70 receives a minimum sulfur load ratio at step S561, and determines whether the ratio of the current sulfur load to the maximum sulfur load is larger than or equal to the minimum sulfur load ratio at step S562. After that, the controller 70 determines whether the engine operation mode is the SDPF regeneration mode, the satisfaction signal of the soot load condition is output, the ratio of the current sulfur load to the maximum sulfur load is larger than or equal to the minimum sulfur load ratio at step S563, and outputs a satisfaction signal of the SDPF regeneration completion condition at step S564 if the step S563 condition is satisfied.

Hereinafter, referring to FIG. 16, step S503 in FIG. 12 will be described in further detail.

Figure 16:
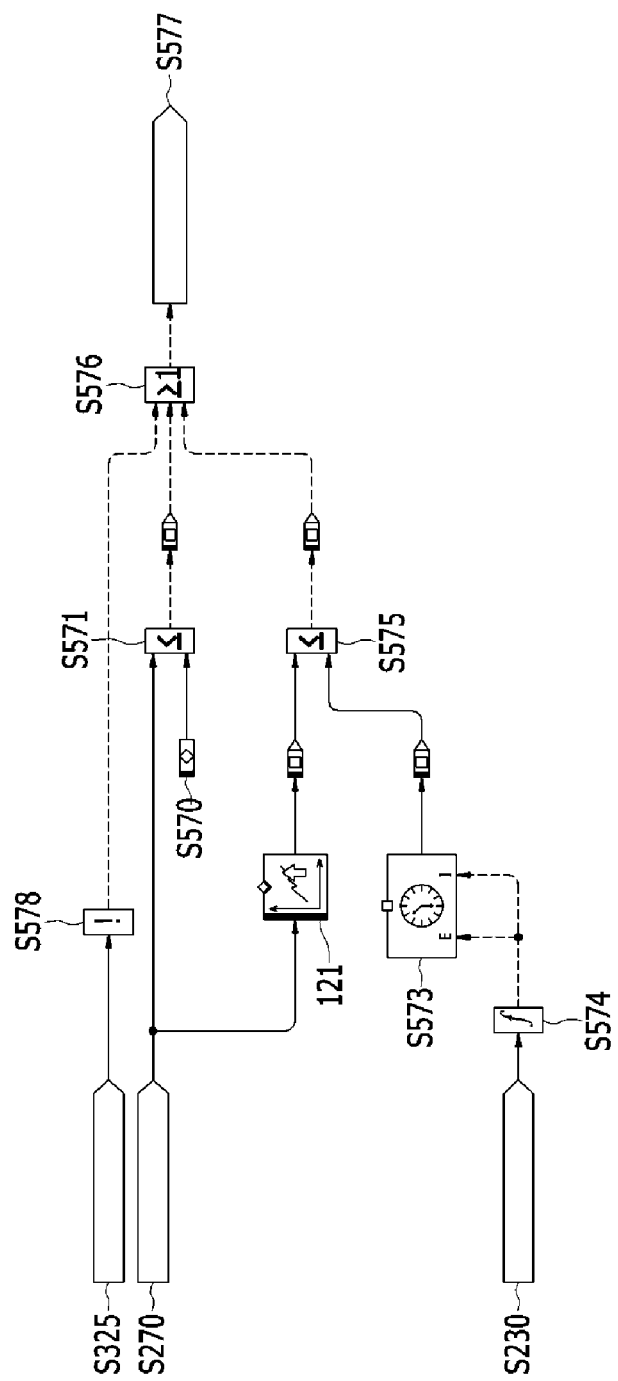
FIG. 16 illustrates step S503 in FIG. 12 in further detail.

As shown in FIG. 16, the controller 70 negates the non-satisfaction signal of the desulfurization break condition at step S578 so as to determine whether a satisfaction signal of the desulfurization break condition is output. In addition, the controller 70 receives a desulfurization reset sulfur load at step S570, and determines whether the sulfur load in the LNT 40 is smaller than the desulfurization reset sulfur load at step S571. In addition, the controller 70 inputs the sulfur load in the LNT 40 into a predetermined map 121 so as to calculate a desulfurization rich demand duration, and determines whether the engine operation mode is the desulfurization rich mode at step S574. After that, the controller 70 calculates a time for which the engine operation mode is the desulfurization rich mode at step S573, and determines whether the time for which the engine operation mode is the desulfurization rich mode is longer than or equal to the desulfurization rich demand duration at step S575. The controller 70 determines whether the satisfaction signal of the desulfurization break condition is output, the sulfur load in the LNT 40 is smaller than or equal to the desulfurization reset sulfur load, if the time for which the engine operation mode is the desulfurization rich mode is longer than or equal to the desulfurization rich demand duration at step S576, and outputs a satisfaction signal of the desulfurization reset condition at step S577 if any one condition of the step S576 condition is satisfied.

Hereinafter, referring to FIG. 17, step S140 in FIG. 4 will be described in further detail.

Figure 17:
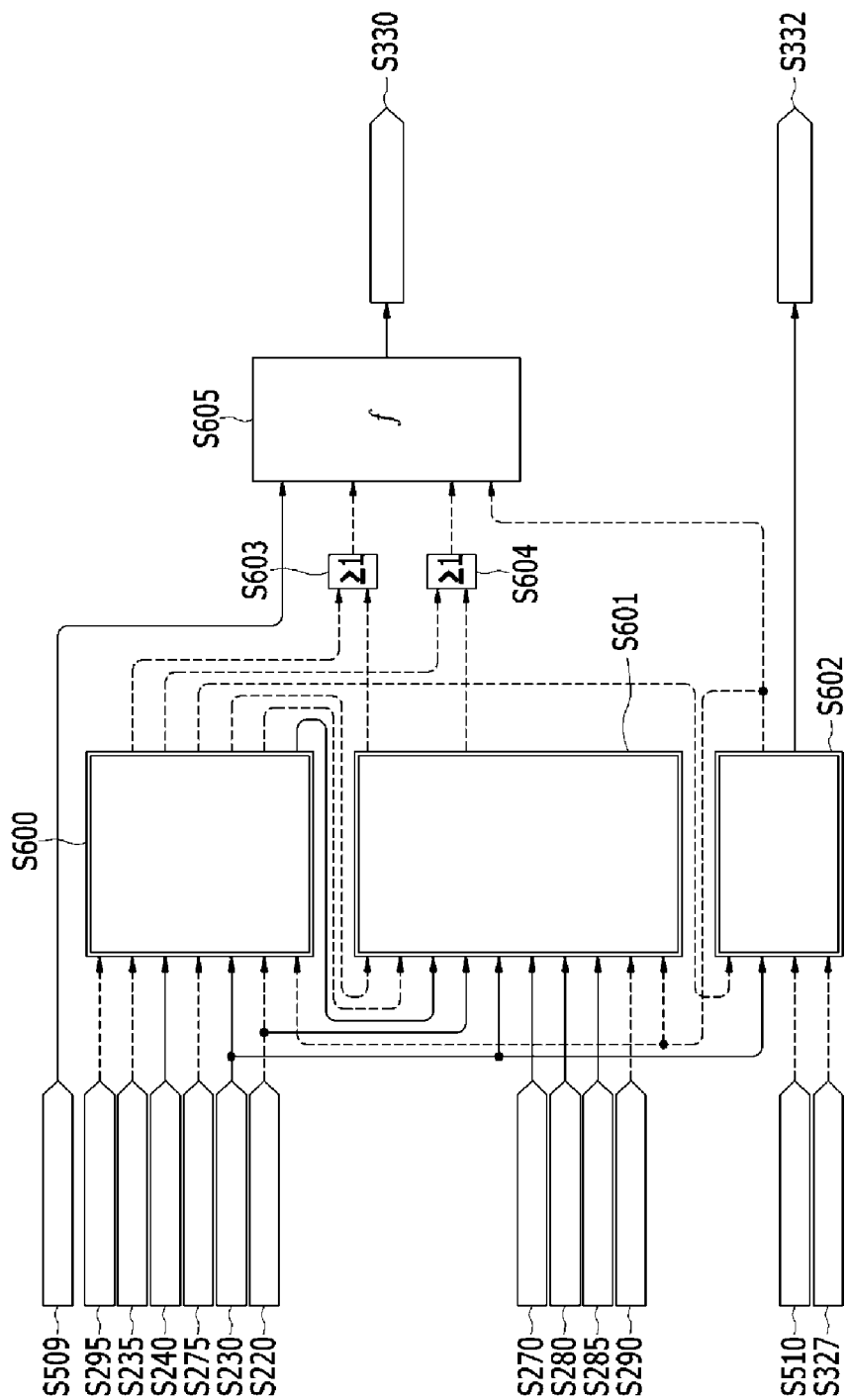
FIG. 17 illustrates step S140 in FIG. 4 in further detail.

As shown in FIG. 17, the controller 70 determines whether a mode switching condition due to a desulfurization temperature is satisfied at step S600, determines whether a mode switching condition due to generation of H2S is satisfied at step S601, and determines a temperature controllable state at step S602.

In further detail, the controller 70 receives the target temperature of the exhaust gas passing through the LNT 40 at the desulfurization lean mode at step S295, receives the engine speed at step S235, receives the engine torque at step S240, receives the mass flow of the exhaust gas at step S275, receives the engine operation mode at step S230, the temperature at the downstream of the LNT at step S220, and receives the temperature controllable state at step S650. After that, the controller 70 determines whether the mode switching condition due to desulfurization temperature is satisfied based on the target temperature of the exhaust gas passing through the LNT 40 at the desulfurization lean mode, the engine speed, the engine torque, the mass flow of the exhaust gas, the engine operation mode, the temperature at the downstream of the LNT, and the temperature controllable state at step S600, and outputs a satisfaction signal of a lean mode condition due to the desulfurization temperature and a satisfaction signal of a rich mode condition due to the desulfurization temperature from a determination result at step S600 at steps S624 and S631.

In addition, the controller 70 receives the sulfur load in the LNT 40 at step S270, receives the O2 adsorption in the LNT 40 at step S280, receives the upstream lambda at step S285, and receives whether the lambda sensor synchronization occurs at step S290. After that, the controller 70 determines whether the mode switching condition due to generation of H2S is satisfied based on a temperature state above target window, a temperature state below target window and a lean period correction factor determined at step S600, the engine operation mode, the temperature at the downstream of the LNT, the sulfur load in the LNT 40, the O2 adsorption in the LNT 40, the upstream lambda, whether the lambda sensor synchronization occurs and the tempera-ture controllable state at step S601, and outputs a satisfaction signal of a rich mode condition due to generation of H2S and a satisfaction signal of a lean mode condition due to generation of H2S from a determination result at step S601 at steps S662 and S676.

In addition, the controller 70 receives the satisfaction signal of the desulfurization demand condition at step S510, and receives the satisfaction signal of the soot load condition at step S327. After that, the controller 70 determines the temperature controllable state based on a target window temperature state, the engine operation mode, the satisfaction signal of the desulfurization demand condition and the satisfaction signal of the soot load condition at step S602, and outputs the temperature controllable state at step S650.

The controller 70 determines whether the satisfaction signal of the lean mode condition due to the desulfurization temperature or the satisfaction signal of the lean mode condition due to generation of H2S is outputs at step S603, and determines whether the satisfaction signal of the rich mode condition due to the desulfurization temperature or the satisfaction signal of the rich mode condition due to generation of H2S is output at step S604. After that, the controller 70 outputs the progress of desulfurization based on the desulfurization condition state, the determination results at steps S603 and S604 and the temperature controllable state at step S330.

Hereinafter, referring to FIG. 18, step S600 in FIG. 17 will be described in further detail.

Figure 18:
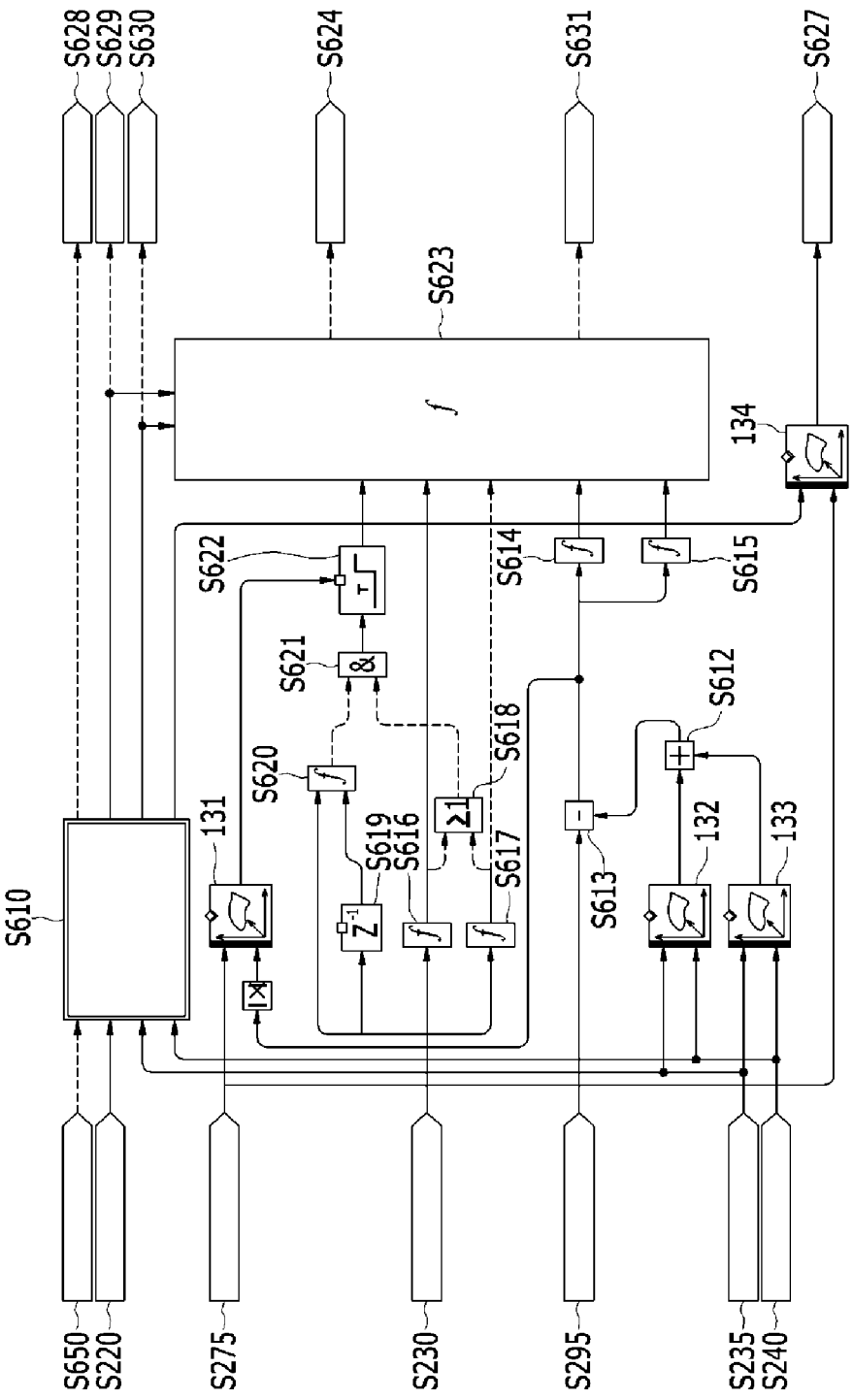
FIG. 18 illustrates step S600 in FIG. 17 in further detail.

As shown in FIG. 18, the controller 70 determines a target temperature window condition for desulfurization based on the temperature controllable state, the temperature at the downstream of the LNT, the engine speed and the engine torque at step S610, and outputs the target window temperature state, the temperature state above target window, the temperature state below target window and a difference between a target temperature and an actual temperature from a determination result at step S610 at steps S628, S629, S630, and S647.

The controller 70 inputs the engine speed and the engine torque into a predetermined map 133 so as to calculate a mode switching temperature offset, inputs the engine speed and the engine torque into another predetermined map 132 so as to calculate a rich mode temperature at steady state, and calculates a rich mode target temperature at steady state by adding the rich mode temperature at steady state and the mode switching temperature offset at step S612. Herein, the rich mode temperature at steady state and the mode switching temperature offset mean the temperature of the exhaust gas passing through the LNT 40, and the mode switching temperature offset is used to consider a temperature rise due to mode switching and the O2 in the LNT 40. After that, the controller 70 calculates a temperature difference between the desulfurization lean mode and the desulfurization rich mode by subtracting the rich mode target temperature at steady state from the target temperature of the exhaust gas passing through the LNT 40 at the desulfurization lean mode at step S613. In addition, the controller 70 calculates a sign of the temperature difference between the desulfurization lean mode and the desulfurization rich mode at steps S614 and S615.

In addition, the controller 70 inputs an absolute value of the temperature difference between the desulfurization lean mode and the desulfurization rich mode and the mass flow of the exhaust gas into a predetermined map 131 so as to calculate a delay time, determines at step S618 whether the engine operation mode is the desulfurization rich mode at step S616 or the engine operation mode is the desulfurization lean mode at step S617, and determines at step S619 whether the engine operation mode continues for a predetermined delay at step S620. After that, the controller 70 determines whether the engine operation mode is the desulfurization rich mode or the desulfurization lean mode and the engine operation mode continues for the predetermined delay at step S621, determines whether the conditions at the step S621 continues for the delay time at step S622, and outputs a satisfaction signal of a delay time condition if the condition at the step S622 is satisfied.

After that, the controller 70 calculates a target mode at step S623 based on the temperature state above target window (Hi), the temperature state below target window (Lo), the satisfaction signal of the delay time condition, a signal that the engine operation mode is the desulfurization lean mode (Lean) or the desulfurization rich mode (Rich) and the sign of the temperature difference between the desulfurization lean mode and the desulfurization rich mode, and outputs a satisfaction signal of the lean mode condition due to the desulfurization temperature (Lean) or a satisfaction signal of the rich mode condition due to the desulfurization temperature (Rich) from a calculation result at the step S623 at steps S624 and S631. The calculation at the step S623 will be briefly described in [Table 1].

TABLE 1

| Temperature state | Operation mode | Sign of temperature difference | Output signal |
|---|---|---|---|
| Hi | Rich | Negative | Lean |
| Hi | Lean | Negative | Lean |
| Lo | Rich | Positive | Lean |
| Lo | Lean | Positive | Lean |
| Hi | Rich | Positive | Lean |
| Hi | Lean | Positive | Rich |
| Lo | Rich | Negative | Lean |
| Lo | Lean | Negative | Rich |

In addition, the controller 70 inputs the mass flow of the exhaust gas and the temperature difference between the target temperature and the actual temperature into a predetermined map 134 so as to calculate and output a lean period correction factor at step S627.

Hereinafter, referring to FIG. 19, step S610 in FIG. 18 will be described in further detail.

Figure 19:
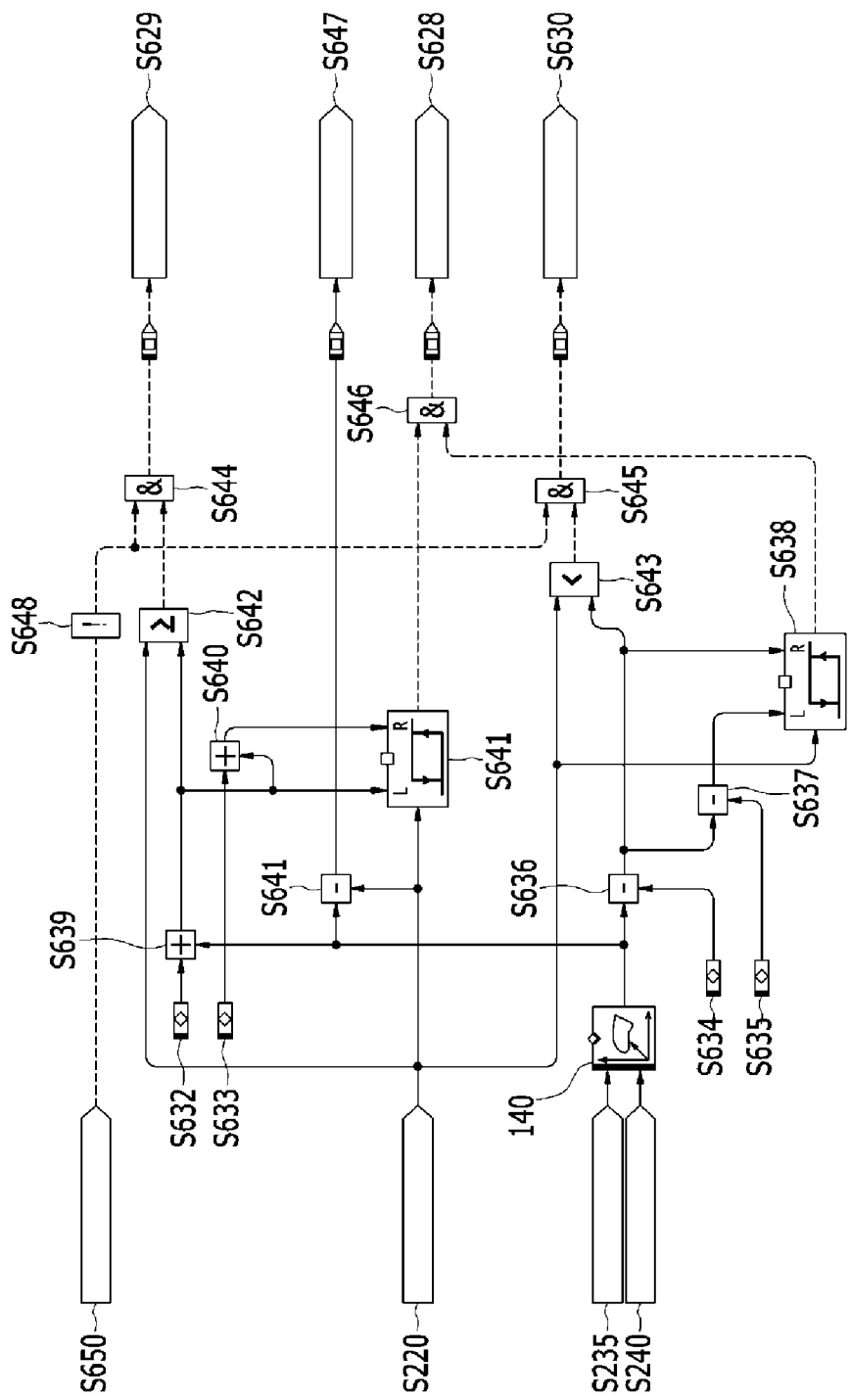
FIG. 19 illustrates step S610 in FIG. 18 in further detail.

As shown in FIG. 19, the controller 70 inputs the engine speed and the engine torque into a predetermined map 140 so as to calculate a target temperature, and receives a minimum temperature offset and a minimum temperature offset threshold at steps S634 and S635. After that, the controller 70 calculates a minimum target window temperature by subtracting the minimum temperature offset from the target temperature at step S636, and calculates a minimum threshold temperature by subtracting the minimum temperature offset threshold from the minimum target window temperature at step S637.

In addition, the controller 70 receives a maximum temperature offset and a maximum temperature offset threshold at steps S632 and S633, calculates a maximum target window temperature by adding the maximum temperature offset to the target temperature at step S639, and calculates a maximum threshold temperature by adding the maximum temperature offset threshold to the maximum target window temperature at step S640.

After that, the controller 70 determines whether the temperature at the downstream of the LNT is higher than or equal to the maximum target window temperature at step S642, and determines whether the temperature at the downstream of the LNT is lower than the minimum target window temperature at step S643. In addition, the controller 70 negates the temperature controllable state so as to output the temperature uncontrollable state at step S648, determines whether the temperature uncontrollable state is output and the temperature at the downstream of the LNT is higher than or equal to the maximum target window temperature at step S644, and outputs the temperature state above target window if the temperature uncontrollable state is output and the temperature at the downstream of the LNT is higher than or equal to the maximum target window temperature at the step S629. In addition, the controller 70 determines whether the temperature uncontrollable state is output and the temperature at the downstream of the LNT is lower than the minimum target window temperature at step S646, and outputs the temperature state below target window if the temperature uncontrollable state is output and the temperature at the downstream of the LNT is lower than the minimum target window temperature at step S630.

In addition, the controller 70 calculates and outputs the difference between the target temperature and the actual temperature at step S647 by subtracting the temperature at the downstream of the LNT from the target temperature at step S641.

In addition, the controller 70 determines whether the temperature at the downstream of the LNT is within the maximum target window temperature and the maximum threshold temperature at step S641, and determines whether the temperature at the downstream of the LNT is within the minimum target window temperature and the minimum threshold temperature at step S638. After that, the controller 70 determines whether the temperature at the downstream of the LNT is not within the maximum target window temperature and the maximum threshold temperature and determines whether the temperature at the downstream of the LNT is not within the minimum target window temperature and the minimum threshold temperature at step S645. If the temperature at the downstream of the LNT is not within the maximum target window temperature and the maximum threshold temperature and is not within the minimum target window temperature and the minimum threshold temperature at step S645, the controller 70 outputs the target window temperature state at step S628.

Hereinafter, referring to FIG. 20, step S601 in FIG. 17 will be described in further detail.

Figure 20:
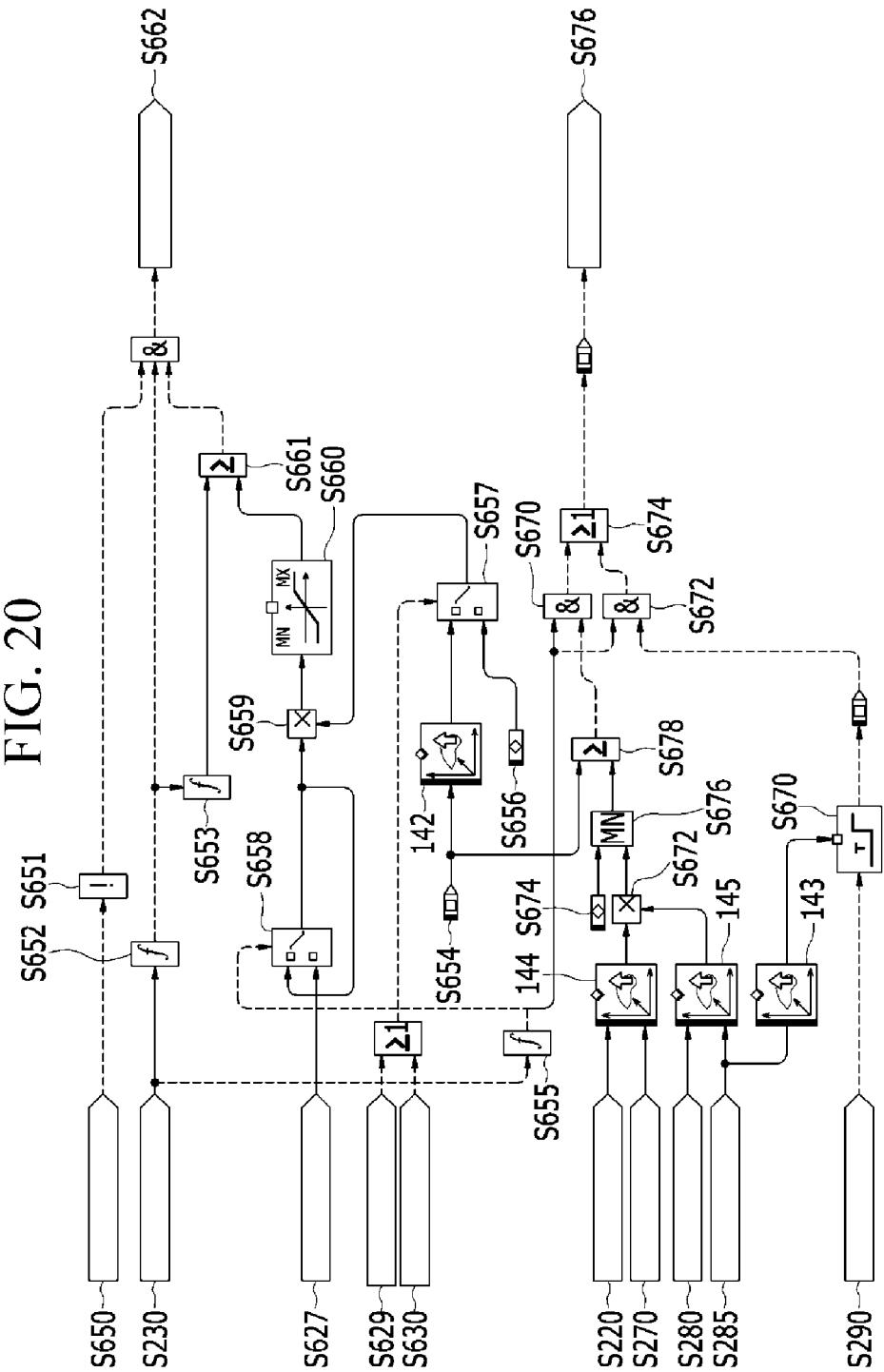
FIG. 20 illustrates step S601 in FIG. 17 in further detail.

As shown in FIG. 20, the controller 70 negates the temperature controllable state so as to output the temperature uncontrollable state at step S651, determines whether the engine operation mode is the desulfurization lean mode at step S652, and checks a time for which the engine operation mode is the desulfurization lean mode at step S653.

In addition, the controller 70 determines whether the engine operation mode was the desulfurization rich mode in the past at step S655, outputs a new lean period correction factor if the engine operation mode is the desulfurization rich mode at step S658, and outputs a previous lean period correction factor if the engine operation mode is the desulfurization rich mode at step S658. Further, the controller 70 receives a time for which the engine operation mode is the desulfurization rich mode (hereinafter, it will be called 'rich mode period') at step S654 (in this specification, since the engine operation mode is the desulfurization lean mode, the rich mode period means an accumulated time for which the engine operation mode was the rich mode in the past), and inputs the rich mode period into a predetermined map 142 so as to calculate a base lean period. The controller 70 receives a predetermined base lean period at step S656, selects the predetermined base lean period as the base lean period if the temperature state above target window or the temperature state below target window is output at step S657, and selects a base lean period as the base lean period if the temperature state above target window and the temperature state below target window are not output at step S657. After that, the controller 70 calculates a target lean period at step S659 by multiplying the base lean period selected at step S657 and the lean period correction factor output at step S658, and compares the target lean period with a maximum value and a minimum value so as to output a final target lean period at step S660. After that, the controller 70 determines whether a time for which the engine operation mode is the desulfurization lean mode is longer than or equal to the final target lean period at step S661.

The controller 70 outputs a satisfaction signal of the rich mode condition due to generation of H2S at step S662 if the temperature uncontrollable state is output at step S651, the engine operation mode is the desulfurization lean mode at step S652, and the time for which the engine operation mode is the desulfurization lean mode is longer than or equal to the final target lean period at step S661.

The controller 70 inputs the upstream lambda into a predetermined map 143 so as to calculate a lambda synchronization delay time, and determines whether the lambda synchronization delay time has passed since a lambda sensor synchronization signal was input at step S670.

In addition, the controller 70 inputs the temperature at the downstream of the LNT and the sulfur load in the LNT 40 into a predetermined map 144 so as to calculate a base rich period, inputs the O2 adsorption in the LNT 40 and the upstream lambda into a predetermined map 145 so as to calculate a rich period correction factor, and calculates a maximum rich mode period by multiplying the base rich period and the rich period correction factor at step S672. The controller 70 receives a threshold maximum rich mode period at step S674, selects a minimum value of the maximum rich mode period and the threshold maximum rich mode period as a target maximum rich mode period at step S676, and determines whether a time for which the engine operation mode is the desulfurization rich mode is longer than or equal to the target maximum rich mode period at step S678.

After that, at step S674, the controller 70 determines whether the engine operation mode is the desulfurization rich mode and the time for which the engine operation mode is the desulfurization rich mode is longer than or equal to the target maximum rich mode period at step S670, or determines whether the engine operation mode is the desulfurization rich mode and the lambda synchronization delay time has passed since the lambda sensor synchronization signal was input at step S672, and outputs a satisfaction signal of the lean mode condition due to generation of H2S at step S676 if the step S674 condition is satisfied.

Hereinafter, referring to FIG. 21, step S602 in FIG. 17 will be described in further detail.

Figure 21:
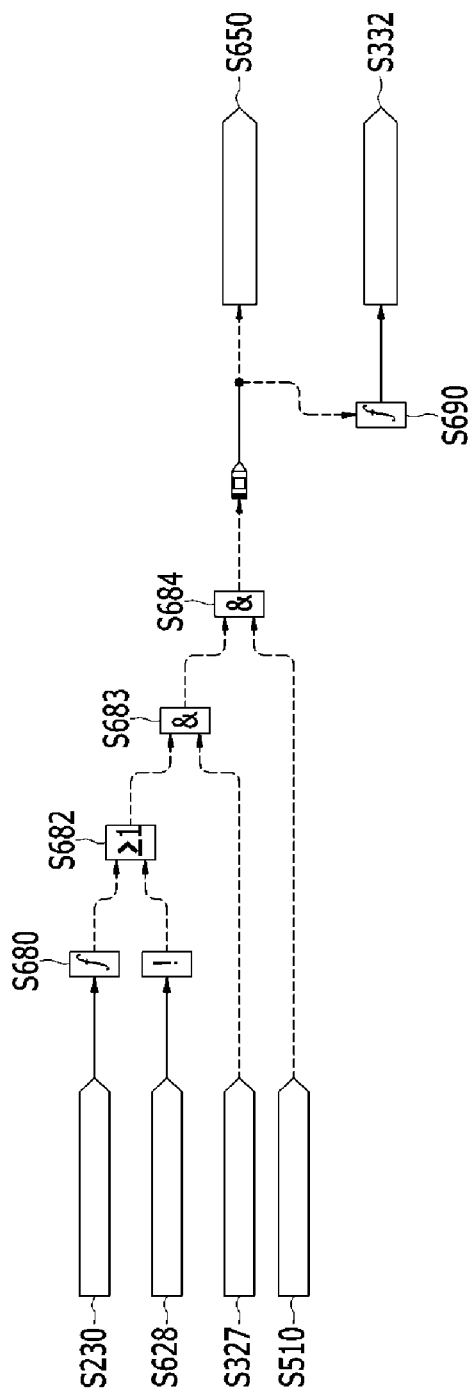
FIG. 21 illustrates step S602 in FIG. 17 in further detail.

As shown in FIG. 21, the controller 70 determines whether the engine operation mode is the SDPF regeneration mode at step S680, and negates the target window temperature state so as to output the opposite value of the target window temperature state at step S681. The controller 70 determines whether the engine operation mode is the SDPF regeneration mode or the target window temperature state is "False" or "0" at step S682, and determines whether the S682 condition is satisfied and the satisfaction signal of the soot load condition is input at step S683. After that, the controller 70 determines whether the step S683 condition is satisfied and the satisfaction signal of the desulfurization demand condition is output at step S684, and outputs the temperature controllable state if the step S684 condition is satisfied at step S650.

In addition, the controller 70 calculates the desulfurization lean mode period at step S332 by adding up a time for which the temperature controllable state is output at step S690.

While this disclosure has been described in connection with what is presently considered to be practical exemplary embodiments, it is to be understood that the disclosure is not limited to the disclosed embodiments, but, on the contrary, is intended to cover various modifications and equivalent arrangements included within the spirit and scope of the appended claims.

What is claimed is:

1. A method of desulfurizing a lean NOx trap (LNT) of an exhaust purification system provided with the LNT and a selective catalytic reduction (SCR) catalyst, the method comprising:
   determining whether a desulfurization feasibility condition of the LNT is satisfied;
   determining whether a desulfurization demand condition of the LNT is satisfied; and
   performing desulfurization of the LNT if both of the desulfurization feasibility condition of the LNT and the desulfurization demand condition of the LNT are satisfied,
   wherein the desulfurization of the LNT is performed by repeating a desulfurization lean mode and a desulfurization rich mode according to whether a mode switching condition due to a desulfurization temperature is satisfied and whether a mode switching condition due to generation of H2S is satisfied,
   wherein the mode switching condition due to the desulfurization temperature is satisfied when a lean mode condition due to the desulfurization temperature or a rich mode condition due to the desulfurization temperature is satisfied based on a temperature state above a target window, a temperature state below the target window, whether a delay time condition is satisfied, an engine operation mode and sign of a temperature difference between the desulfurization lean mode and the desulfurization rich mode.

2. The method of claim 1, wherein the temperature state above the target window and the temperature state below the target window are determined based on a temperature controllable state, a temperature at a downstream of the LNT, an engine speed and an engine torque.

3. The method of claim 1, wherein the delay time condition is satisfied when (1) the engine operation mode is the desulfurization rich mode or the desulfurization lean mode, (2) the engine operation mode continues for a predetermined delay, and satisfaction of the conditions (1) and (2) continues for a delay time.

4. The method of claim 3, wherein the delay time is calculated based on an absolute value of the temperature difference between the desulfurization lean mode and the desulfurization rich mode and a mass flow of an exhaust gas.

5. The method of claim 1, wherein the mode switching condition due to generation of H2S is satisfied when a rich mode condition due to generation of H2S or a lean mode condition due to generation of H2S is satisfied.

6. The method of claim 5, wherein the rich mode condition due to generation of H2S is satisfied when a temperature uncontrollable state is output, the engine operation mode is the desulfurization lean mode, and a time for which the engine operation mode is the desulfurization lean mode is longer than or equal to a final target lean period.

7. The method of claim 6, wherein the final target lean period is calculated based on a base lean period according to an accumulated time for which the engine operation mode was the desulfurization rich mode in the past and a lean period correction factor according to the mass flow of the exhaust gas and a difference between a target temperature and an actual temperature.

8. The method of claim 5, wherein the lean mode condition due to generation of H2S is satisfied when the engine operation mode is the desulfurization rich mode, and a time for which the engine operation mode is the desulfurization rich mode is longer than or equal to a period selected from the group consisting of a target maximum rich mode period and a lambda synchronization delay time has passed since a lambda sensor synchronization signal was input.

9. The method of claim 8, wherein the target maximum rich mode period is calculated based on a base rich period according to the temperature at the downstream of the LNT and a sulfur poisoning in the LNT, and a rich period correction factor according to an O2 adsorption in the LNT and an upstream lambda.

10. The method of claim 8, wherein the lambda synchronization delay time is calculated according to an upstream lambda.

11. The method of claim 1, wherein the desulfurization feasibility condition of the LNT is satisfied when an engine operation point condition, a temperature threshold condition for desulfurization, an engine operation mode condition, a vehicle speed condition and a soot load condition are satisfied and a desulfurization break condition is not satisfied.

12. The method of claim 1, wherein the desulfurization demand condition of the LNT is satisfied if any one of a desulfurization beneficial condition, a DPF regeneration completion condition and a sulfur load condition is satisfied.

13. The method of claim 12, wherein the desulfurization beneficial condition is satisfied if a ratio of a current sulfur load to a maximum sulfur load is larger than or equal to a threshold sulfur load ratio, the average temperature of the LNT is higher than or equal to a minimum average temperature of the LNT for desulfurization, and a current vehicle speed is between a maximum desulfurization vehicle speed and a minimum desulfurization vehicle speed.

14. The method of claim 13, wherein the threshold sulfur load ratio is calculated according to a desulfurization beneficial factor, and
wherein the desulfurization beneficial factor is calculated based on a desulfurization condition state, the vehicle travel distance and an engine operation duration.

15. The method of claim 13, wherein the minimum average temperature of the LNT for desulfurization is calculated according to the ratio of the current sulfur load to the maximum sulfur load.

16. The method of claim 15, wherein the maximum sulfur load is calculated by multiplying a maximum sulfur load per volume according to the aging factor of the LNT to a volume of the LNT.

17. The method of claim 12, wherein the DPF regeneration completion condition is satisfied if the engine operation mode is a DPF regeneration mode, the soot load condition is satisfied, and the ratio of the current sulfur load to the maximum sulfur load is larger than or equal to a minimum sulfur load ratio.

18. The method of claim 12, wherein the desulfurization demand condition of the LNT is not satisfied if a desulfurization reset condition is satisfied, and
wherein the desulfurization reset condition is satisfied if a desulfurization break condition is satisfied, a sulfur load in the LNT is smaller than or equal to a desulfurization reset sulfur load, or a duration for which the engine operation mode is the desulfurization rich mode is longer than or equal to a desulfurization rich demand duration.

* * * * *